DATA PROCESSING SYSTEM HAVING VARIABLE RATE READER

Filed Oct. 26, 1964 13 Sheets-Sheet 1

RONALD N. BORRELLI
STANLEY R. OLSON
INVENTORS

BY Armand G. Guibert
AGENT

DATA PROCESSING SYSTEM HAVING VARIABLE RATE READER

DATA PROCESSING SYSTEM HAVING VARIABLE RATE READER

DATA PROCESSING SYSTEM HAVING VARIABLE RATE READER

Filed Oct. 26, 1964

Dec. 13, 1966 R. N. BORRELLI ET AL 3,291,277

DATA PROCESSING SYSTEM HAVING VARIABLE RATE READER

Filed Oct. 26, 1964 13 Sheets-Sheet 7

DATA PROCESSING SYSTEM HAVING VARIABLE RATE READER

Dec. 13, 1966 R. N. BORRELLI ETAL 3,291,277

DATA PROCESSING SYSTEM HAVING VARIABLE RATE READER

Filed Oct. 26, 1964 13 Sheets-Sheet 9

DATA PROCESSING SYSTEM HAVING VARIABLE RATE READER

Filed Oct. 26, 1964 13 Sheets-Sheet 10

DATA PROCESSING SYSTEM HAVING VARIABLE RATE READER

Filed Oct. 26, 1964 13 Sheets-Sheet 11

United States Patent Office 3,291,277
Patented Dec. 13, 1966

3,291,277
DATA PROCESSING SYSTEM HAVING VARIABLE RATE READER

Ronald N. Borrelli, Moraga, and Stanley R. Olson, Oakland, Calif., assignors to SCM Corporation, New York, N.Y., a corporation of New York Filed Oct. 26, 1964, Ser. No. 406,321
28 Claims. (Cl. 197—20)

Figure 12:
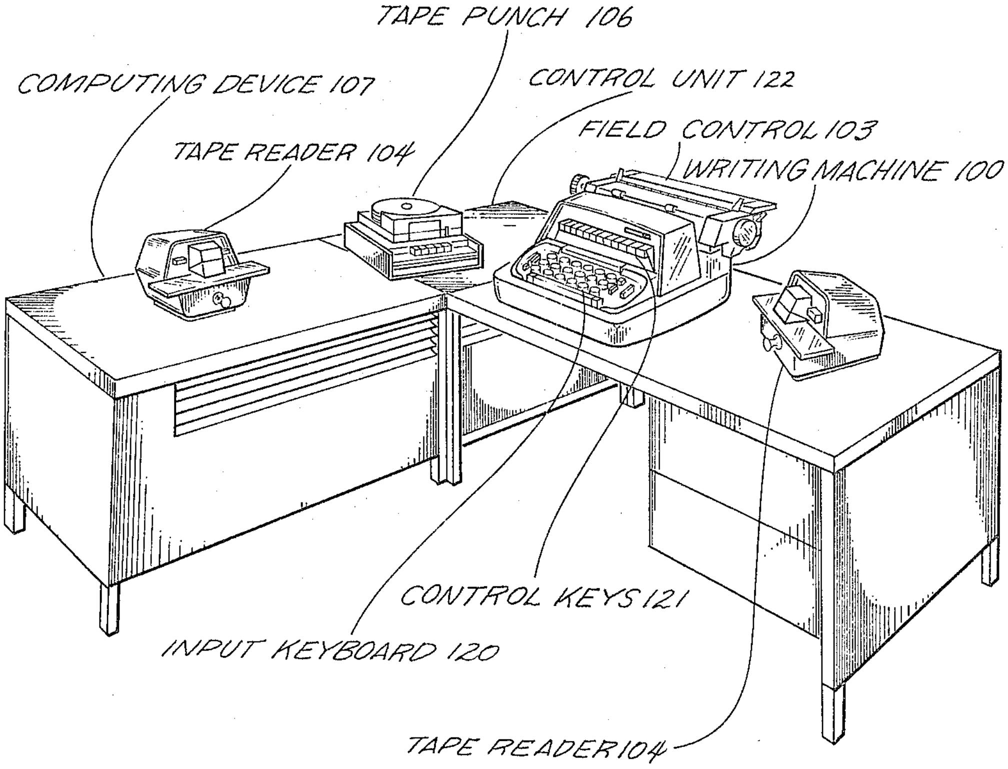

This invention relates to data processing systems having printing means together with other recording devices and/or computing devices, all programming being under control of one or more record readers, except that when control has been transferred to an operator during periods of data input, there is provision for ancillary programming by means of a carriage-position controlled device. It pertains particularly to the timing of operations in systems in which the record medium in one or more readers is selectively read a character at a time, the characters comprising information to be recorded, interspersed with instructions for control of the devices comprising the system. The control instructions in the record medium occur at random and the grouping can vary from a single character to a large number of characters.

More particularly one aspect of the invention concerns improved timing of reader operation in the case that—as generally true—the printer is the slowest part of the system. Most prior art has made the timing compatible with printer operation by limiting the output of a reader to a rate acceptable by the printer. The U.S. Patent 2,865,487, "Record Controlled Printing or Writing Machines," issued to W. J. Hildebrandt on December 23, 1958, has improved upon the timing in a system having a typewriter as the printing means by providing means for sensing "null codes" (those described as having no effect on the typewriter) at a higher rate, but only after sufficient time has elapsed to ensure that a preceding typewriter operation is essentially complete, as determined by means sensitive to the progress of the various typewriter operations. Even with this improvement there are appreciable periods when the system is waiting for essential completion of a printer operation, during which the reader could be sensing control codes or other codes not directed to the printer. Accordingly, the present invention provides means whereby the timing of reader operations is independent of printer operations except when the next code sensed relates to printing operations and cannot be acted upon until the printer has completed its current operation.

A second aspect of this invention concerns improved timing means for concomitant idle advancement of the medium in one reader to a desired position while a second reader controls the system. Prior art systems have required the use of dual sensing circuits and separate sources of timing signals for this purpose. The present invention uses the same circuits and the same source of timing signals for such concomitant idle advancement of the medium in one reader while a second reader is in control of the system.

A third aspect of this invention concerns improved timing of instructions from a "Field Control," a carriage-position controlled program device. Prior art systems have provided means whereby the instructions become effective immediately upon entry into the carriage position or upon depression of a cycle-initiating key, whereas the present invention provides for the action to take effect upon depression of any key in the keyboard, with attendant consideration of problems arising from too fast an operation of successive keys or too slow escapement of the typewriter carriage.

A fourth aspect of this invention concerns improved timing of manually-controlled idle advancement of the record medium, e.g., a paper tape, in a recording device. Prior art systems provide for continuous idle advancement of the tape in the recording device so long as a manually-operated key is held depressed. This arrangement has the limitation that advancement of the medium over a pre-determined number of steps depends upon the skill of the operator. Accordingly, the present invention provides means for a single-step advance of the tape in the recording device for each depression of the tape-feed key when the system is in "Sngle-Step Mode."

It is therefore an object of this invention to provide means for operating a reader at a high rate when the information sensed is in the nature of control instructions and at a lower rate compatible with the limitations of printer speed when the information sensed is in the nature of printing characters or format instructions, the higher rate being effective even when the printer is busy with an operation instituted previously by sensing of a printing character.

Another object of this invention is to provide means for operating the reader at the higher rate when the characters sensed are in the nature of control instructions and the printer is busy with a format instruction.

It is still another object of the invention to provide means whereby the reader can operate at the higher rate when the printer is disabled and characters sensed in the medium are alphanumerics which normally would be read at a slower speed in operating the printer.

It is a basic object of the invention to decrease overall time for response to an arbitrary set of instructions and data, thereby increasing the system productivity.

A further object of this invention is to provide means for high speed idle advancement of the medium in one reader to a predetermined position while the other reader is in control of the system, without use of a dual sensing circuit in the one reader.

Another object of this invention is to provide means for high-speed idle advancement of the medium in one reader to a predetermined position while the other reader is in control of the system, without use of a separate source of timing signals.

Yet another object of this invention is to provide means for rendering a carriage-position controlled program instruction effective only upon depression of any one of the keys in the keyboard, also considering rate of key depression.

Again, an object of this invention is to provide means for a single advance of the medium in a recording device upon depression of a key which normally causes continuous advancement, the single advance being conditioned by means also conditioning a single advance of the medium in the record reader.

Figure 1B:
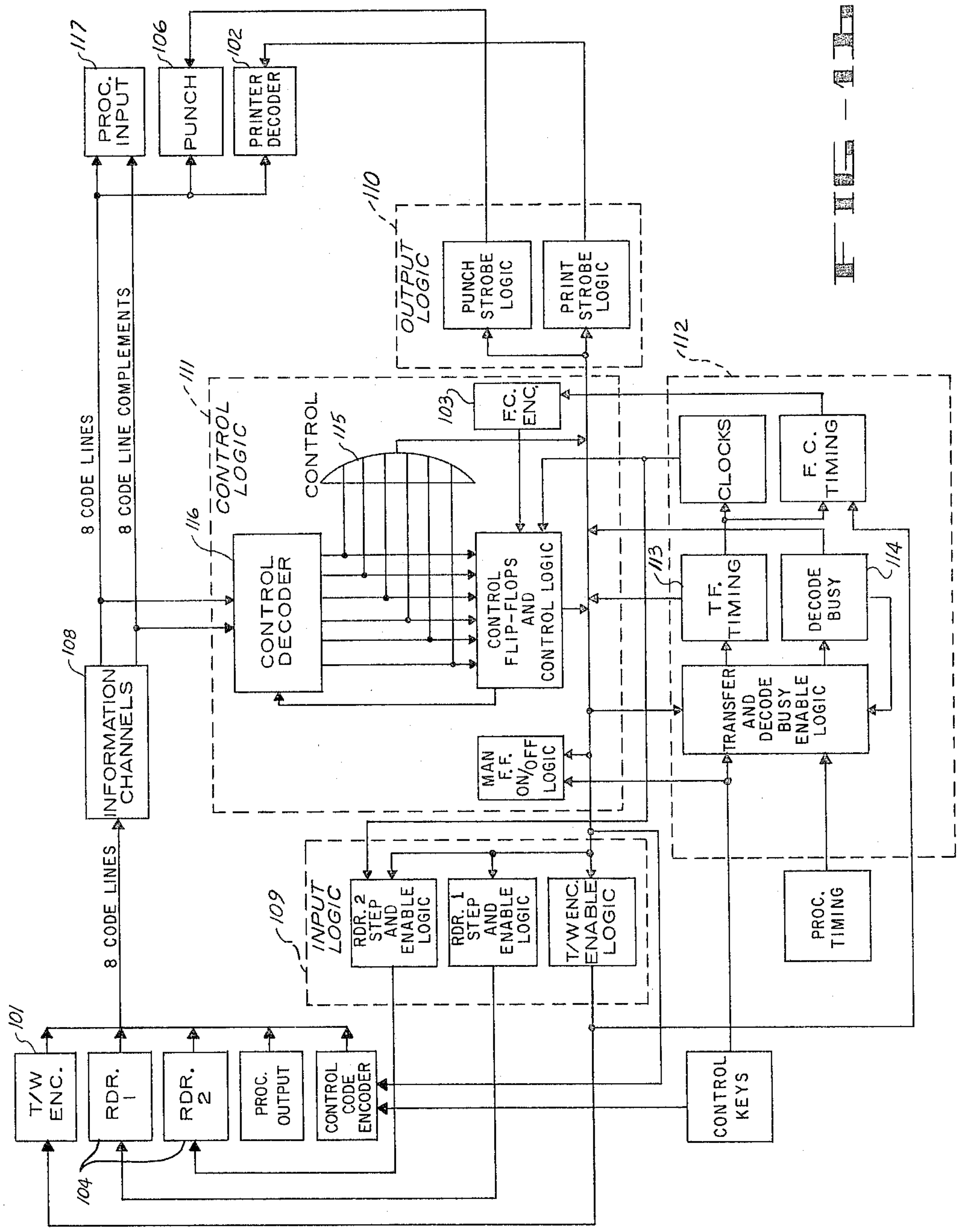

Other objects will become evident from the claims, based on the specification in combination with the accompanying drawings, which comprise:

FIGURE 1*a*—a pictorial of the actual embodiment of the system showing a typewriter, paper-tape readers and punches, control console, and an optional arithmetic or computing device;

FIGURE 1*b*—a block diagram of the system, showing the relation and interconnection of the main components of the system of this invention, including input devices, information channels, utilization devices, control devices, and timing devices.

Figures 2A, 2B:
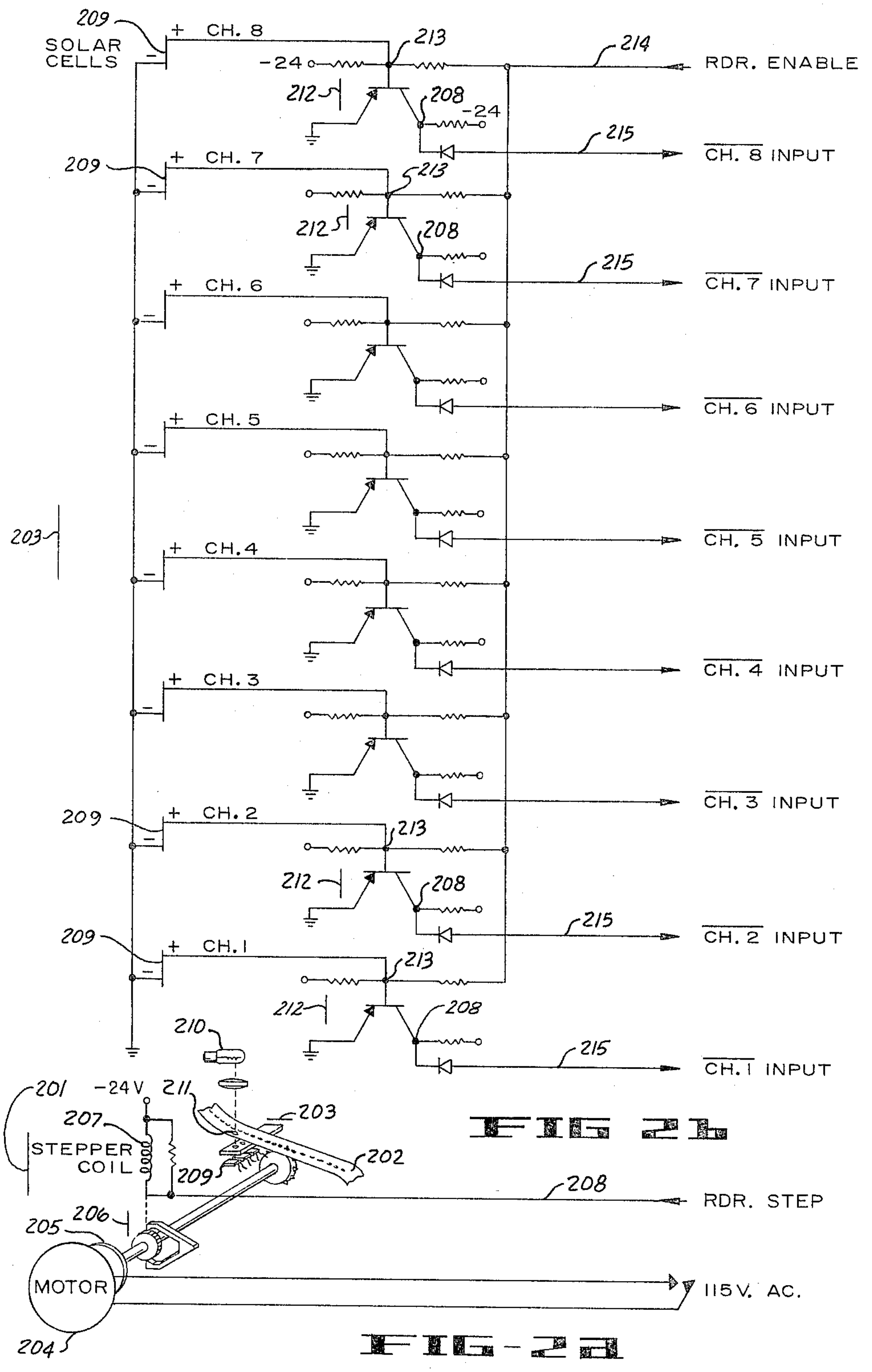
Figure 3:
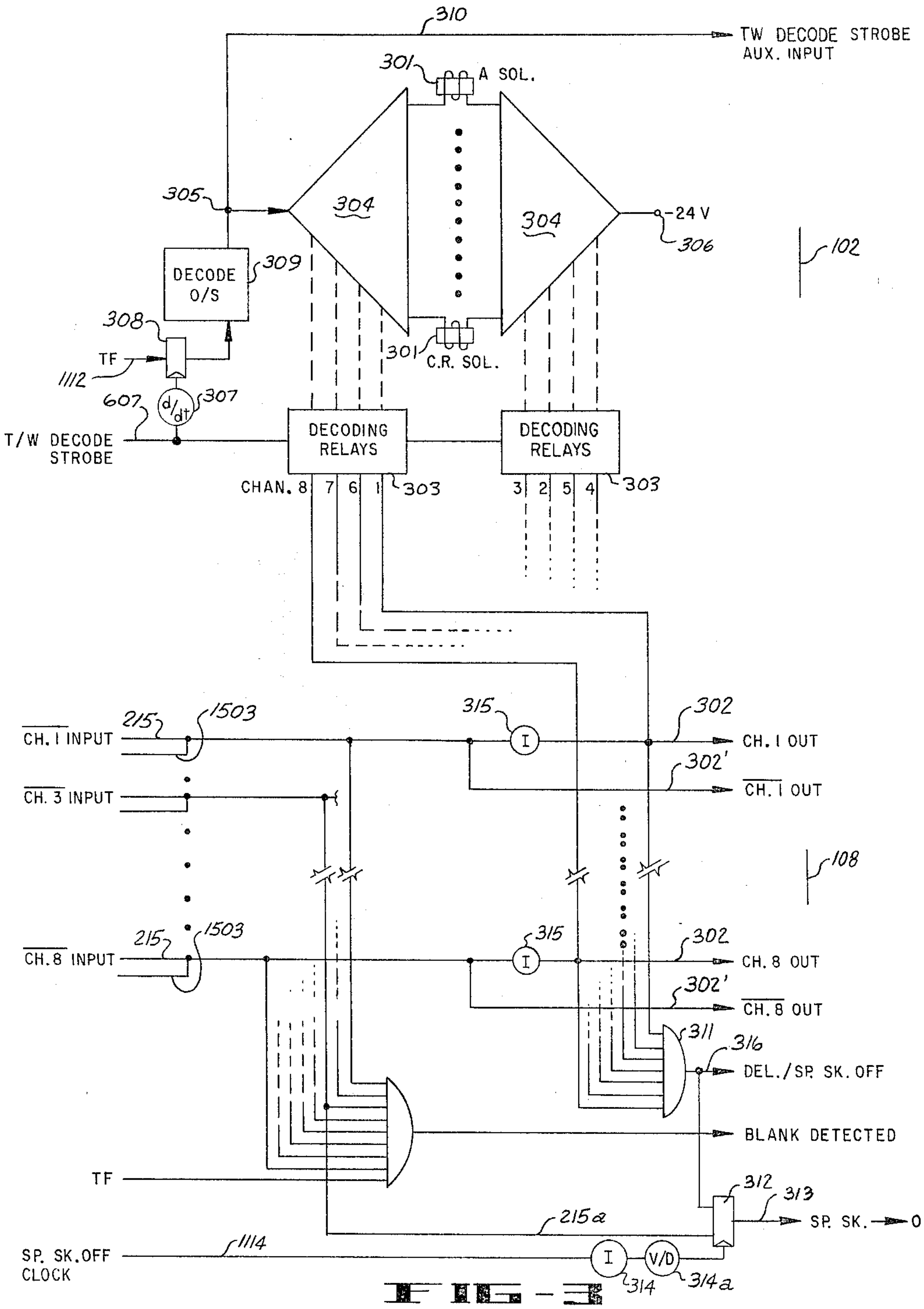
Figure 4:
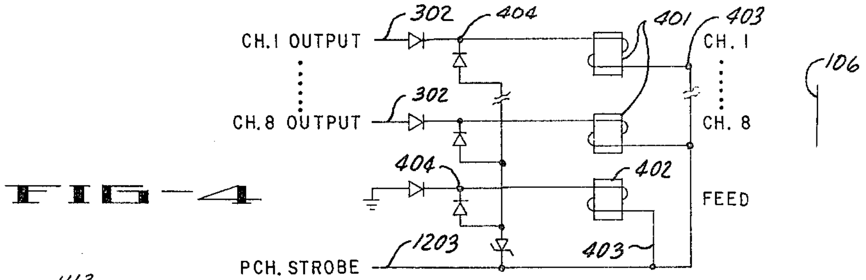
Figure 6:
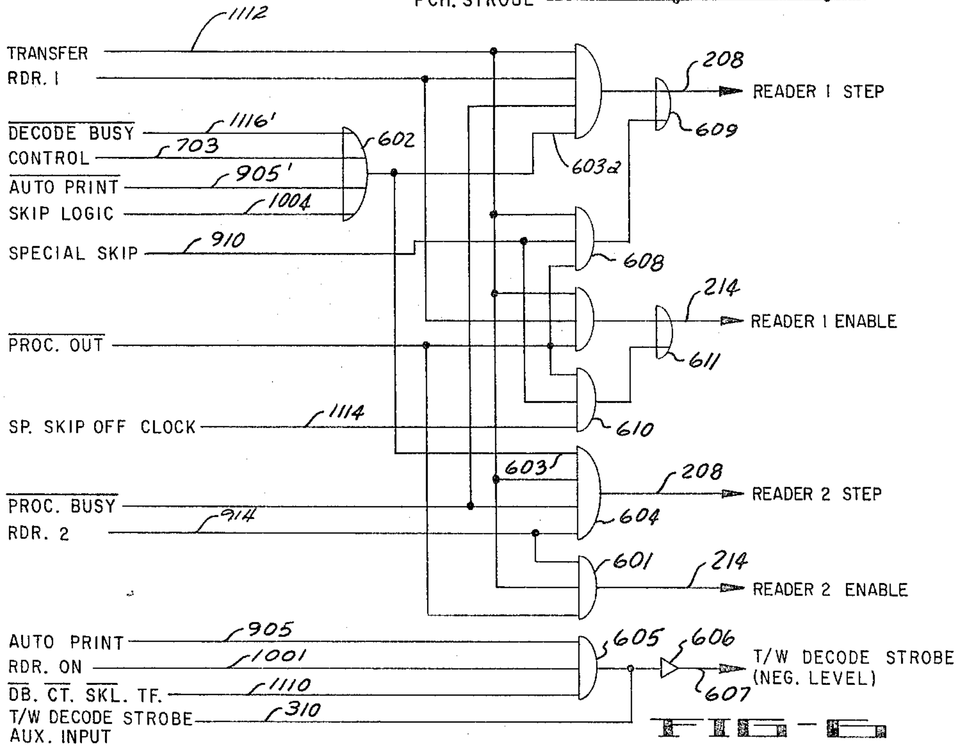
Figure 10:
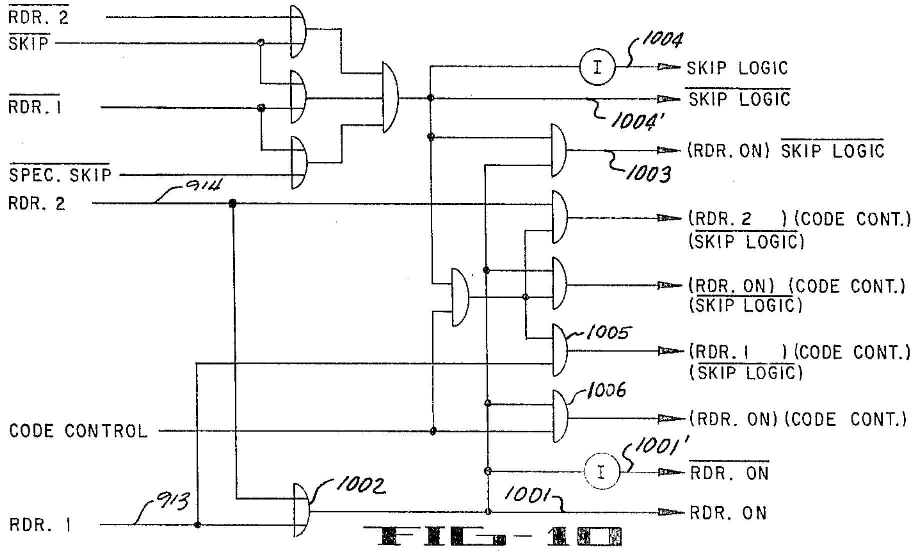
Figure 5:
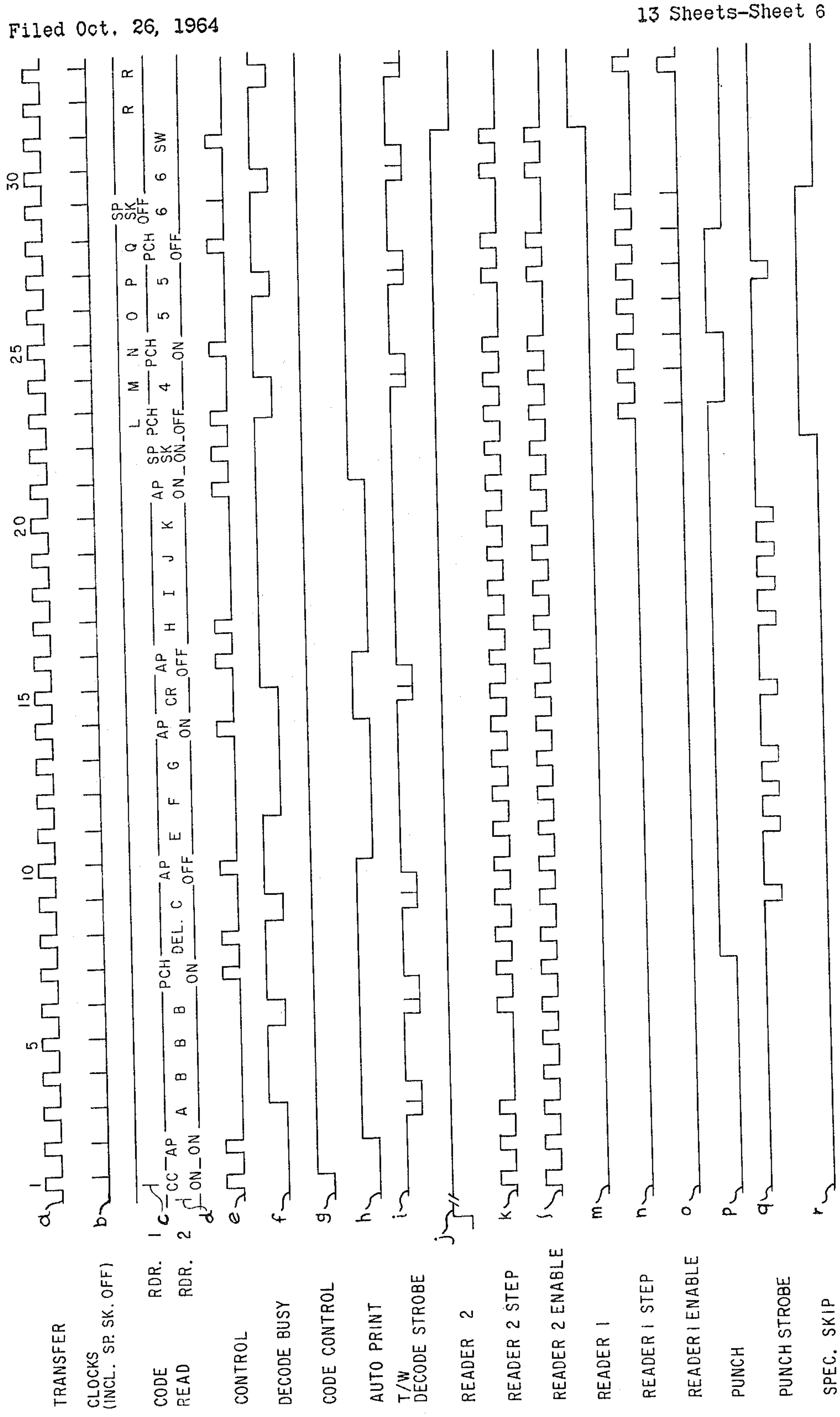
Figure 7:
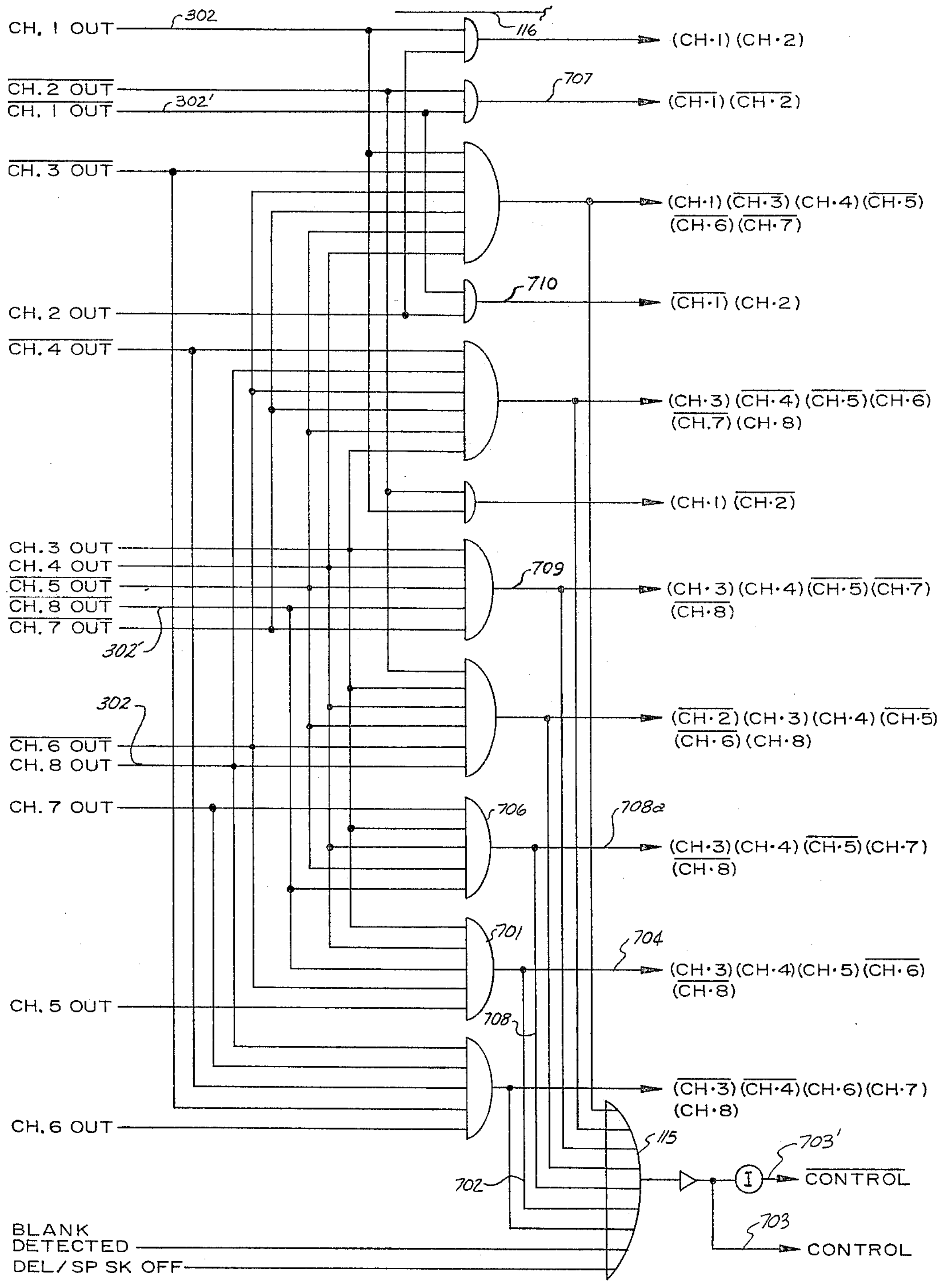
Figure 8:
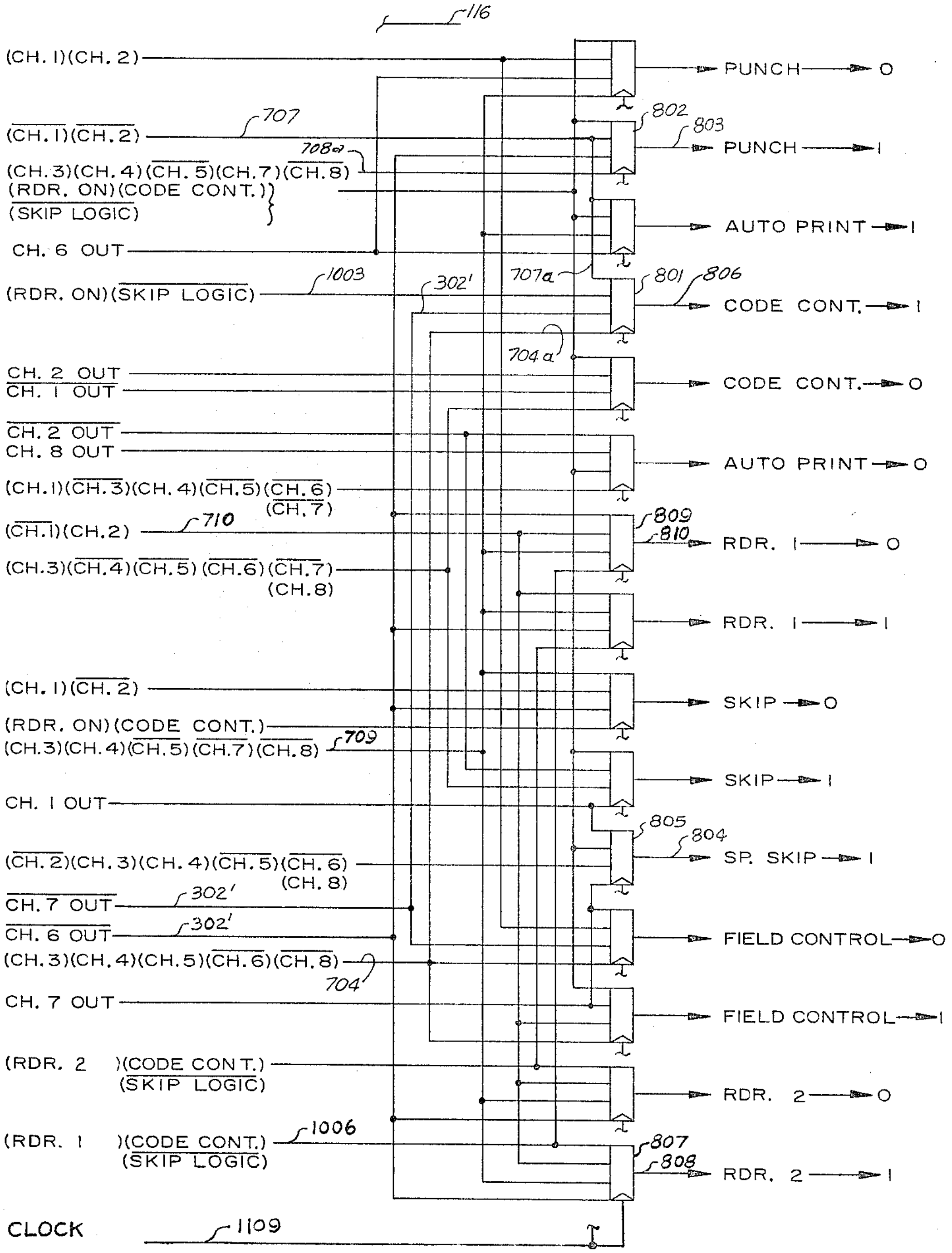
Figure 9:
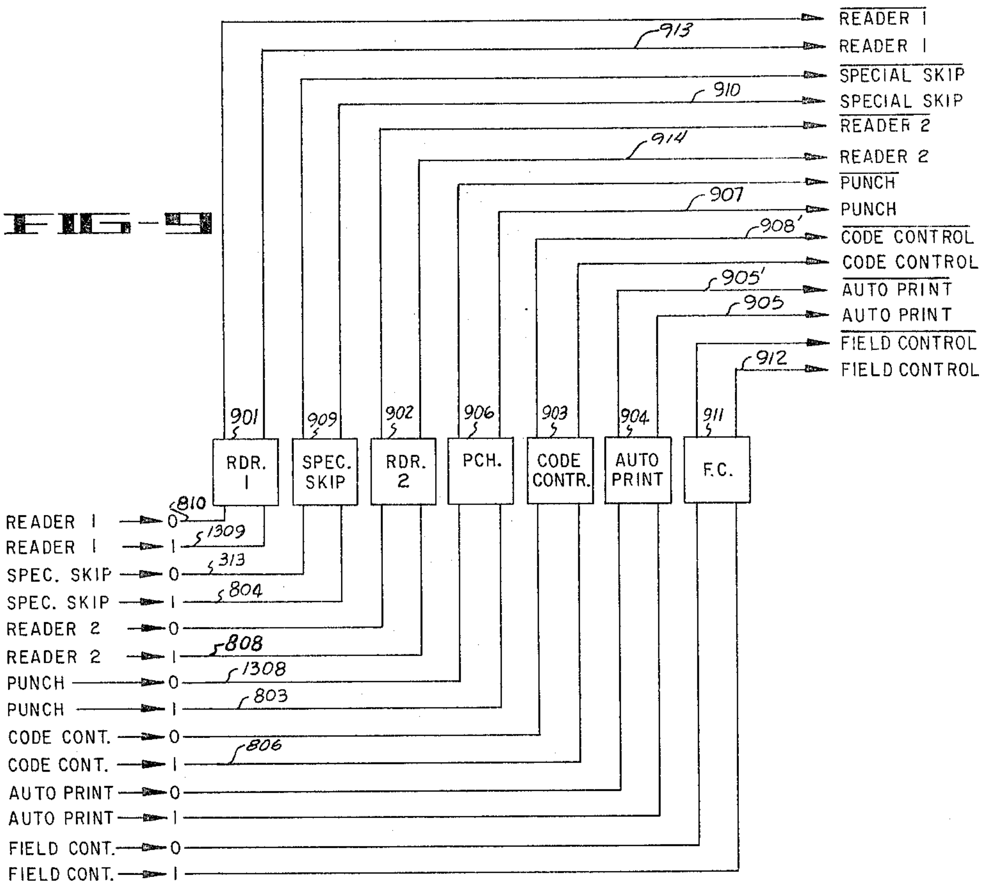
Figure 15:
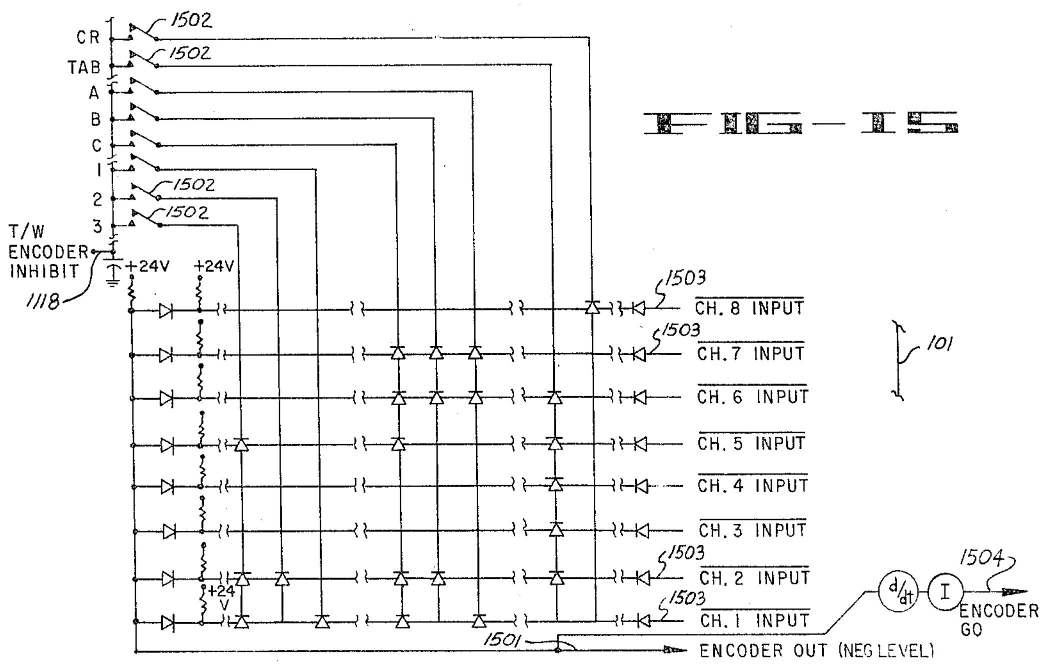
Figure 11:
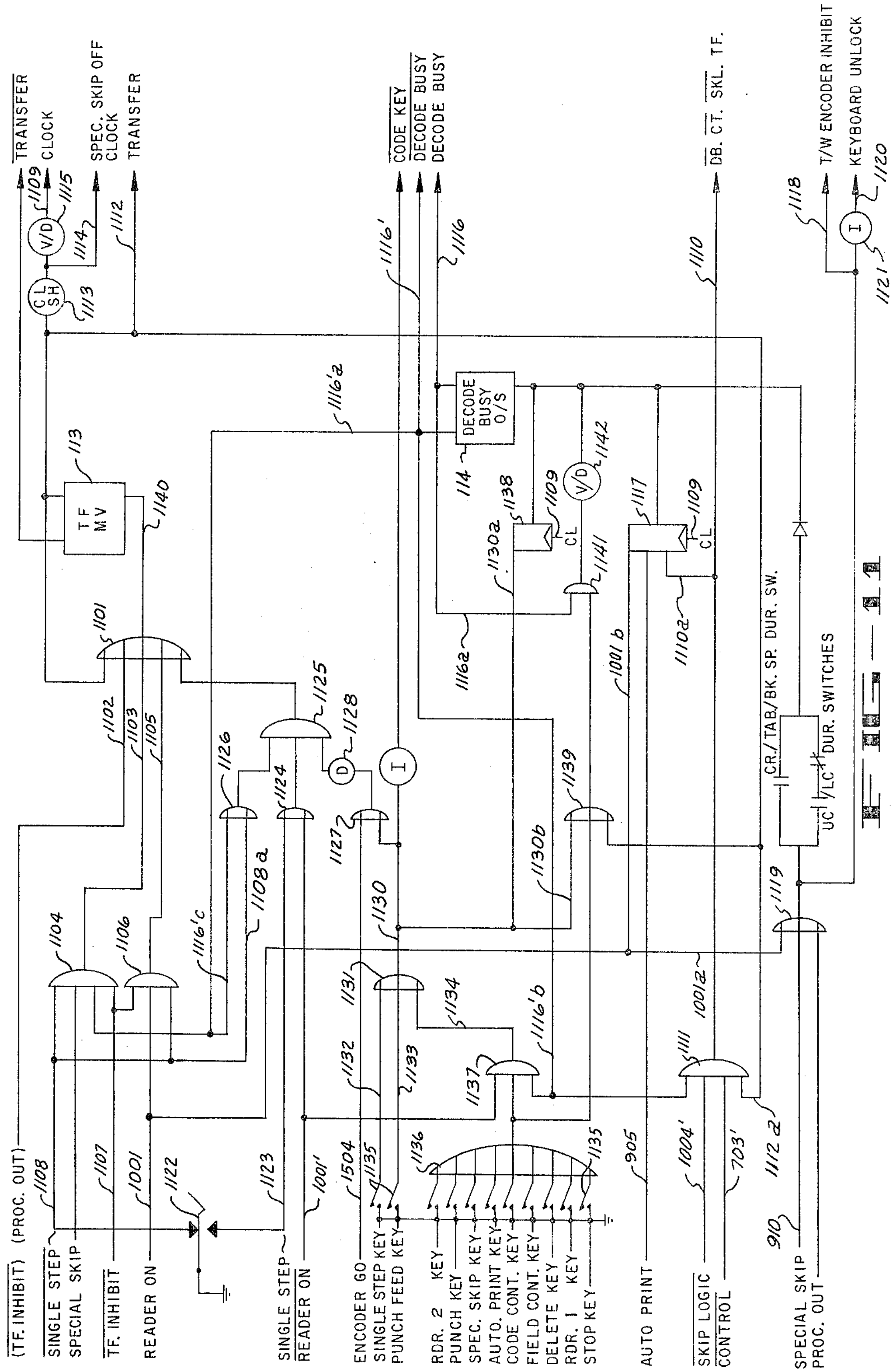
Figure 12:
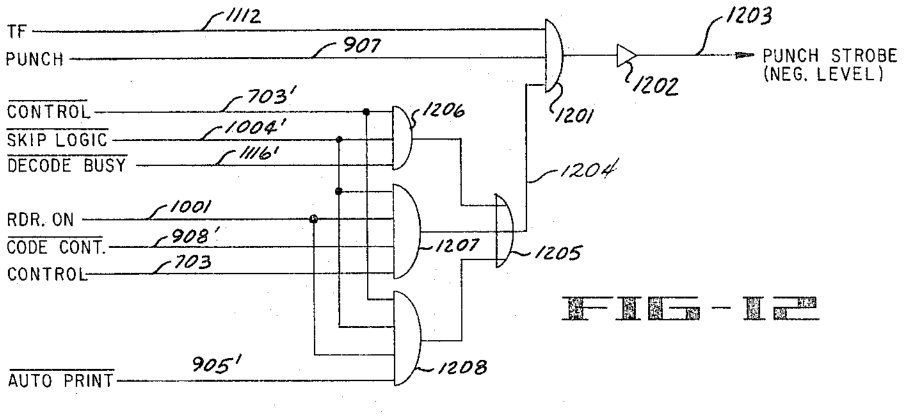
Figure 13:
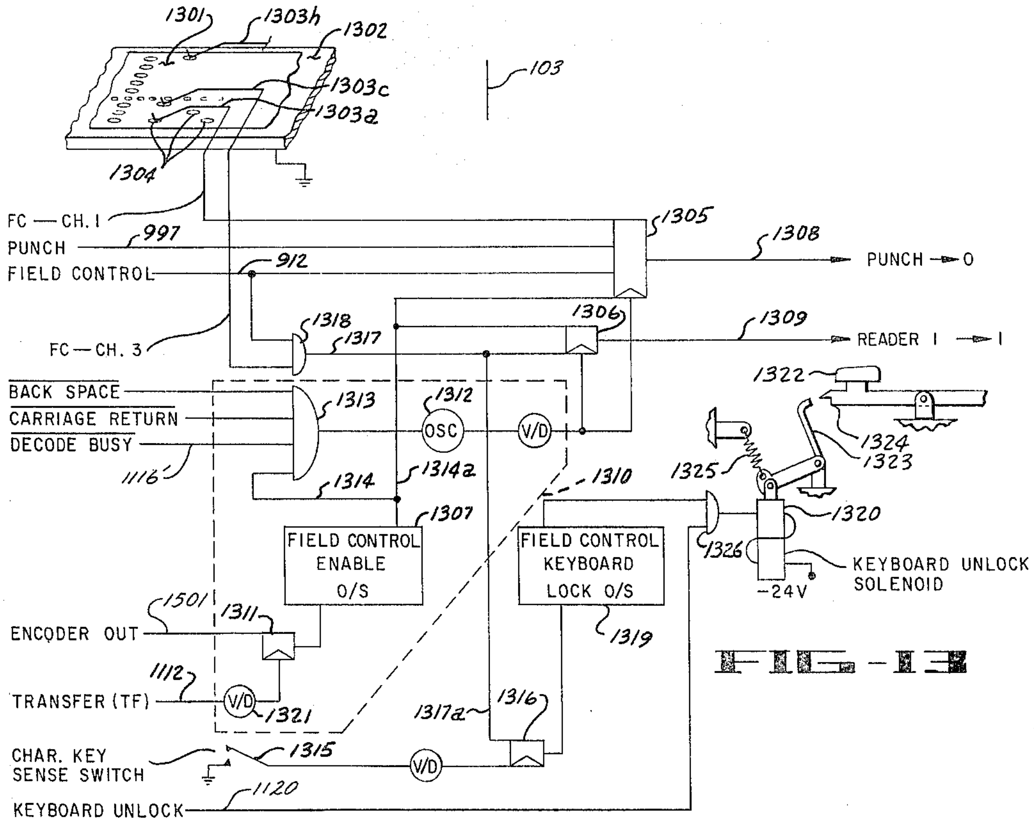
Figure 14:
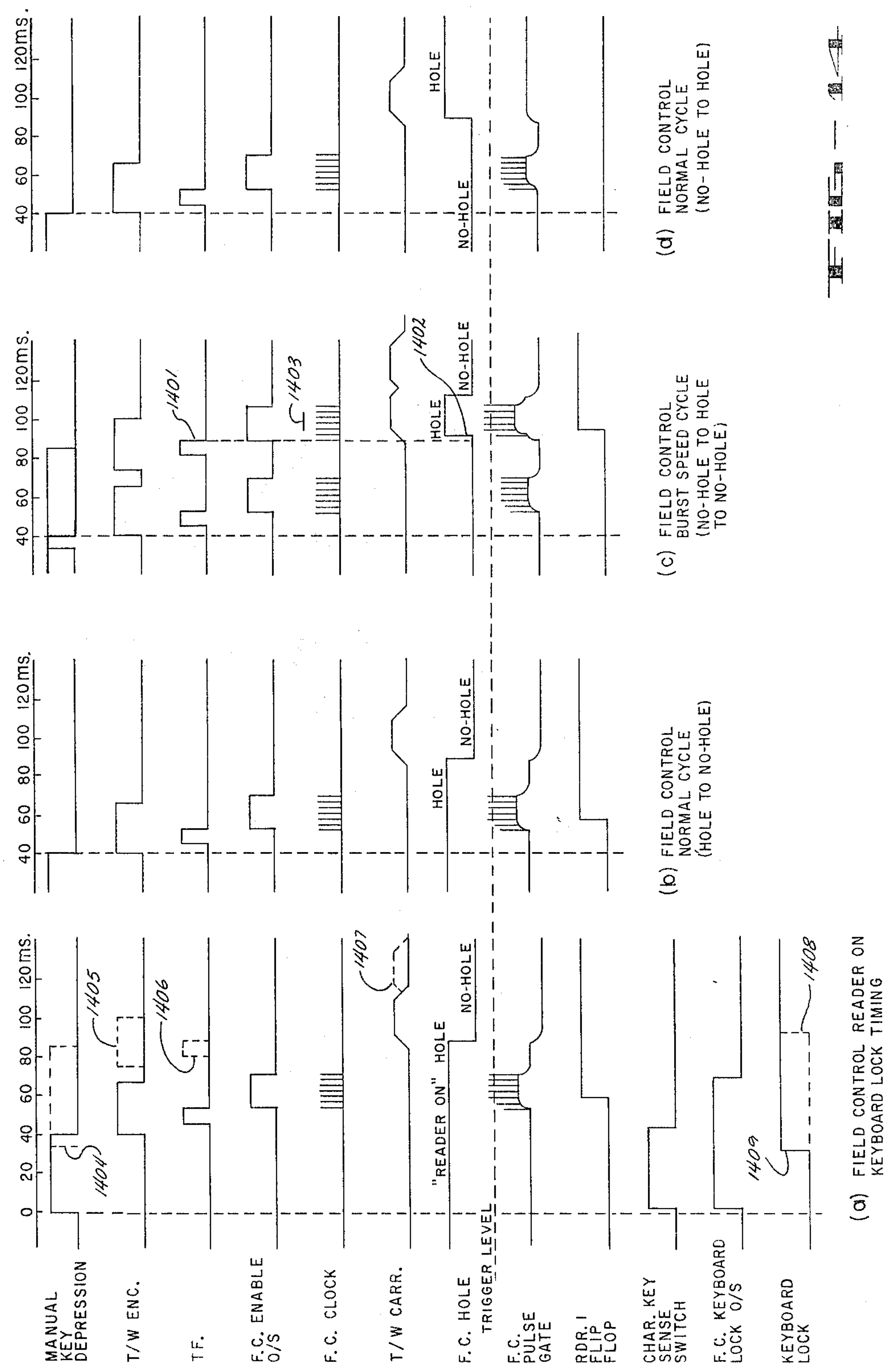
Figure 16B:
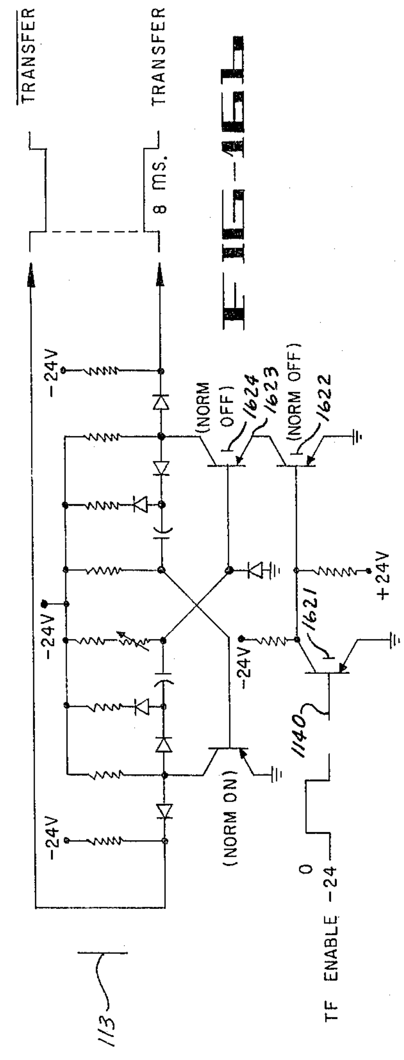
Figure 16A:
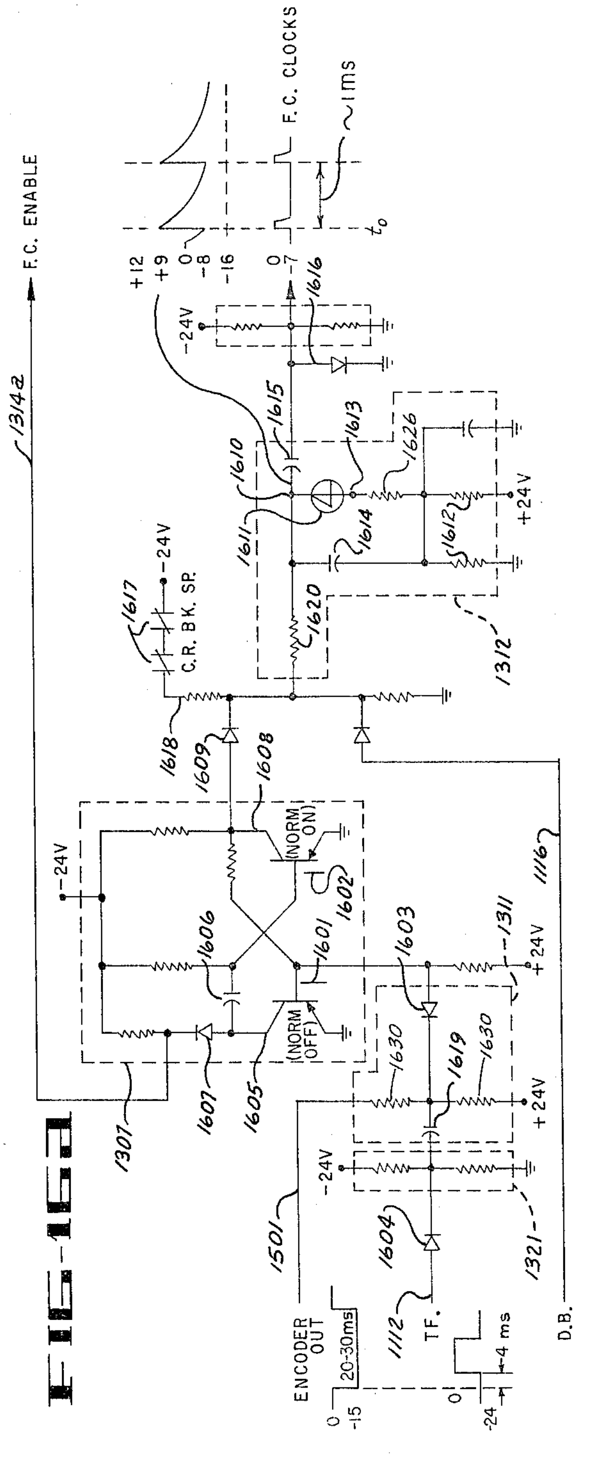

FIGURES 2*a* and 2*b*—an expanded view of a portion of the principal parts of a record reader, and a circuit diagram of the reader sensing elements, respectively, as used in the preferred embodiment of the invention;

FIGURE 3—a detailed schematic diagram of the information channels and the decoding means for operating the typewriter;

FIGURE 4—a detailed schematic diagram of the paper tape perforator (punch) used as a coded media recording device;

FIGURE 5—a timing diagram showing the pulses which control transfer of information in the system and showing the operation of system components according to various aspects of this invention;

FIGURE 6—a logical diagram showing the factors controlling the sensing and advancing of the medium in the reader, and controlling the decoding unit of the typewriter;

FIGURE 7—a logical diagram of part of the decoder for control codes, including an Or gate which signals the presence of such a code;

FIGURE 8—a logical diagram of the remaining part of the decoder for control codes, showing pulse gates through which various control elements are selected;

FIGURE 9—a logical diagram showing various control elements and the output signals they generate;

FIGURE 10—a logical diagram of the gating of output signals from various control elements;

FIGURE 11—a logical diagram of timing means for the system, including gating by which the rate of the timing pulses is variably controlled from the maximum reader speed to a rate compatible with typewriter speed on down to single cycles under manual control;

FIGURE 12—a logical diagram showing the factors entering into control of punch cycling;

FIGURE 13—a logical diagram showing the factors controlling operation of the Field Control and the timing of response to its instructions;

FIGURE 14—timing diagrams illustrating the operation of the Field Control;

FIGURE 15—a wiring diagram of the encoder matrix for the typewriter keyboard, including certain common signal-generating means; and FIGURES 16*a*, *b*—diagrams of typical circuit elements used in the preferred embodiment of the invention.

*System components*

The system to which this invention applies is shown pictorially in FIGURE 1*a* and in block form in FIGURE 1*b* and comprises generally a writing machine 100 having an input keyboard 120 provided with encoding means 101 for providing signals indicative of the key depressed, system control keys 121, and decoding means 102 for automatic operation of the print and format controls of the writing machine, and a carriage-position controlled program device 103, referred to hereinafter as "Field Control." The rest of the system includes two record readers 104, together with another recording device 106 for capture of selected portions of the data. The recording device 106 of the embodiment is a coded media device but could be a slave typewriter, if desired. Similarly, though only shown in pictorial and block form embodiment, the system can include a computing device 107 (herein after referred to as a Processor) for performance of arithmetic operations on numerical data furnished automatically from the readers 104 or manually from the keyboard encoder 101. The readers 104 sense the data in a step-by-step fashion. The record media of the embodiment are of the perforated paper tape variety although the invention is also applicable to readers and recorders for other types of media such as perforated cards, magnetic tapes or cards, photographic films, etc. The readers are essentially those described in Patent 3,141,958 "Record Reader," issued to H. P. Stickel et al., July 21, 1964. In the embodiment disclosed, the writing machine 100 is a typewriter modified for input to and output from the system. The other recording device 106 may be a perforated paper tape punch similar to the one described in co-pending application Serial No. 338,359, "Punching System," filed in the name of R. A. Edwards et al., January 17, 1964. Full details of the structure of the reader and punch are to be found in the patent and the application, respectively, only pertinent portions being given herein.

From the block diagram of the system, FIGURE 1*b*, it will be observed that information from the input devices—readers 104, typewriter keyboard encoder 101, etc.—is sent into information channels 108 from which it goes to the utilization devices—namely, Printer Decoder 102 (comprising typebars and format controls of the modified typewriter 100 used in the embodiment), the punch 106, or input means 117 for the Processor 107 (if such is coupled). The coded information is complemented and both the true codes and their complements can be sent to the utilization devices, if desired. In FIGURE 1*b* there are shown several other general block areas; the input logic 109, output logic 110, control logic 111, and timing logic 112. These are needed to regulate the processing of information from the record medium in the reader. In general, all timing of the system is obtained from the timing logic block, the main source being a normally free-running multivibrator 113, described in greater detail subsequently. The output of multivibrator 113 determines the periods during which information can be transferred from a reader 104 to an output device 102 or 106, via input means 117 to a Processor 107, or control logic 111. Multivibrator 113 will therefore be referred to as the Transfer Multivibrator, and its output as TF.

Each reader 104 comprises (see FIG. 2*a*): drive means 201 for the record medium—a perforated paper tape 202, preferably eight-channel tape—and a sensing station 203. The drive means consists of a continuously rotating motor 204, a friction clutch 205, and an escapement 206 controlled by an electromagnet 207. In response to "Reader Step" signals from the system, appearing on line 208, the drive means causes the tape 202 to move to a new code position, one step for each signal regardless of signal duration. The sensing station 203 contains a number of solar cells 209 equal to the number of channels in the tape 202. The solar cells 209 are photovoltaic devices disposed beneath one surface of the relatively opaque paper tape 202 the other surface of which is exposed to illumination from a focused source of light 210. The voltage output of an individual solar cell 209 is then a function of whether there is a hole (shown generally as 211 in the channel of tape 202) immediately above that particular solar cell, a voltage being developed if there is a hole 211 and substantially no voltage if there is not. The output lead of each solar cell 209 is connected (see FIGURE 2*b*) to the base of a corresponding normally-conducting NPN transistor 212 at the junction 213 of a voltage-dividing resistor network, one terminal of each resistor network being connected to a −24 volt supply and the other terminal to a line 214. Line 214 comes from a reader enabling circuit to be described later. If an enabling signal (voltage at ground level) is present on line 214 (connected in parallel with all of the "other" terminals of the voltage-dividing circuits), wherever holes 211 are present in tape 202 the output from solar cells 209 will be sufficient to cause the corresponding transistors 212 to turn off. The voltage at collectors 208 of those transistors 212 will then go negative. Now it should be pointed out that in this specification the description, except when otherwise noted, will be in terms of positive logic—that is, when an output is TRUE, that output will be at ground potential (or higher); when FALSE, that output will be at some negative potential. From the foregoing, it is clear that the transistor collector voltages will be negative when there is a hole in the tape and vice versa. Thus, they will be the inverse of the information present in the corresponding channel of tape 202. This then is the reason the lines 215 for input to the information channels 108 are labeled $\overline{\mathrm{Ch1}}$, $\overline{\mathrm{Ch2}}$, etc. Furthermore, as evident, a superscript bar is used in this specification to indicate the complementary function, following a common practice.

FIGURE 3 shows the output portion of the modified typewriter (corresponding to "Printer Decoder" block 102) which comprises a 24-volt solenoid actuator 301 for each typebar to be operated or format function to be controlled, the format functions being carriage return, tab, etc. The coded information signals from the eight individual lines 302 of information channels 108 control a number of relays 303, the contacts of which are arranged in a double relay tree 304 in well-known fashion around the solenoids 301, such that upon operating the relays 303 in various combinations one path, and only one, will be established in each instance through the double tree 304, thus providing selection of a desired one of solenoids 301. Application of a zero volt pulse to one terminal 305 of the double tree 304 will then result in operation of that solenoid 301, inasmuch as the other terminal 306 of tree 304 is connected to a —24 volt supply.

Punch 106 (see FIG. 4 is a step-by-step device also, the punches for perforating the paper tape (not shown) each being controlled by a solenoid 401 corresponding to one of the channels of information in the reader tape 202, and a solenoid 402 controlling the feeding of the tape to be punched.

*General operation*

As mentioned earlier, the main source of timing is the multivibrator 113, normally free-running when the system is operating automatically, but disabled and only operable in single cycle fashion during manual operation as will be described later. Multivibrator 113 has a normal free-running rate of 30 c.p.s., the output being "high" (zero volts) for 8 milliseconds and "low" (—24 volts) for the following 25 milliseconds. The 8 millisecond output pulse is used to control "transfer" of information from the reader to one or more utilization devices via information channels 108. Actually, during this transfer period there is no activation of the elements which are to respond to the code, rather conditions are set up for selection of these elements. At the end of the transfer pulse, as will be described subsequently, clock pulses are generated which trigger electronic devices in the circuits controlling operation of selected elements, such as type bars, function controls, punches, or control devices as the case may be. At the same time that the TF pulse enables transfer of information from the reader into the information channels, the reader is also caused to step to the next code location. The reader can operate reliably at the 30 c.p.s. rate of the multivibrator, but the rate is, however, too fast for the modified typewriter 100. For reliable operation under all conditions of use and servicing it is ordinarily required that the system supply the typewriter with information at a rate not greater than ten cycles per second. For this purpose, in timing logic 112 there is included a 72 millisecond monostable multivibrator or "One-Shot" 114, termed "Decode Busy," which triggers at clock time whenever typewriter output (Printer Decoder 102) is enabled. The output of One-Shot 114 prevents strobing of the previously mentioned double relay tree 304 in typewriter output 102. Note, though, that it does not prevent operation of TF multivibrator 113 which will cause reader 104 to sense the next code about twenty-five milliseconds after the end of the previous pulse. If this next code is one related to operation of the typewriter, then nothing will occur at this time since the state of "Decode Busy" One-Shot 114 will prevent strobing of relay tree 304 and stepping of a reader 104. Because of the duration of output from One-Shot 114, only repeated sensing of the same code will occur until the third TF pulse (or a later TF pulse in certain cases, as will be seen) after the original. By that time previous typewriter action should have been completed and typewriter output 102 should be ready for the next code. Note that if a typewriter function (carriage return, tabulation, etc.) was initiated by the code sensed on tape 202, means are provided to extend the inhibiting effect of Decode Busy One-Shot 114 until that function action is completed.

From the foregoing, it follows that if the next code on tape 202 were neither an alpha-numeric character nor a typewriter function, then the time after detection of a previous code to the completion of a typewriter action would be wasted. In the prior art (U.S. Patent 2,865,487, cited earlier) significant time is saved if a large plurality of "null codes" follow one another, but little or no time is saved, normally, since a few of these codes are generally interspersed with many typewriter codes—including function codes of long duration, such as carriage return. Hence, according to the structure of the patent cited above, though start of a reader cycle provides for sensing the next code shortly after typewriter action begins, response to the code is deferred until more than midway in a type bar action or until close to the end of the action in the case of a typewriter function such as carriage return. Thus, at best less than one extra code can be sensed between successive type bar operations. In contradistinction, the structure of the present invention does not depend upon sensing essential completion of any typewriter motion, but merely requires a determination as to whether the next code is a control code or not. If it is, then response to this code may occur immediately; if not, then the system must await a signal indicating that the typewriter can accept its next instruction. In this fashion, an extra two codes can be sensed between each type bar operation, and many extra codes can be sensed during carriage returns—up to 29 codes if the return occurs over the full length of the carriage. Furthermore, under circumstances where a long typewriter function such as carriage return is in process and the tape 202 contains subsquent control codes together with alphanumeric codes which are not to be printed but are to be utilized in Punch 106 or a Processor 107, then limitation to "control codes" is not necessary. This follows because the current invention, together with the "Code Control Mode" of operation disclosed in co-pending application USSN 157,425, "Data Processing Mechanisms," filed by R. N. Borrelli, et al., December 6, 1961, and having the same assignee, makes possible the sensing of a code to turn off the printer response (without effect on the action already in process) so that the subsequent non-printing alpha-numeric codes can be responded to at the high rate of the reader. In this fashion up to 29 control codes *and* alphanumeric codes can be sensed and responded to in the time required for carriage return or other function to be completed. There is thus a considerable saving in time. This mode of operation whereby control codes can be responded to while the typewriter is operating, is referred to as "parallel processing" and is described in detail in the following.

*Parallel processing*

The general timing diagrams FIGURES 5*a* through 5*r* which illustrate several facets of the invention, will be referred to for purposes of describing Parallel Processing. FIGURES 5*a* through 5*r* show the timing with one reader 104 (hereinafter referred to as "Reader 2") initially in the "on" state, multivibrator 113 therefore running free. Exexplary codes present in the respective tapes 202 of Reader 2 and the other reader 104 (hereinafter referred to as "Reader 1") are shown in FIGS. 5*d* and 5*c*, respectively.

FIG. 11 shows the means for enablying multivibrator 113. A ground level must be present on any one of five inputs to an Or gate 1101 for multivibrator 113 to be enabled. A first input to gate 1101 comes from the output of multivibrator 113. This feedback is needed to ensure that multivibrator 113 will stay enabled for its full period of output (8 ms.) no matter how short the duration of the enabling signal. The next input, that on line 1102, comes from a Processor 107, if coupled. It is included here merely to show that a processor can also control the timing means. Line 1103 comes from an And gate 1104, the function of which relates to what is termed "Special Skip," an operation described in detail later and therefore only mentioned here. The fourth input, line 1105, comes from another And gate 1106. The function of And gate 1106 is to enable multivibrator 113 for free-running operation whenever a reader 104 is on and certain other conditions are met, as follows. Either reader 104 being on will develop a high level on line 1001, labeled "Reader On" (FIG. 10) through an Or gate 1002, the inputs to this latter gate coming from the set side outputs 913 and 914 of the Reader 1 and Reader 2 control flip-flops, 901 and 902, respectively (FIG. 9). There being three inputs to And gate 1106, the other two conditions will be seen (FIG. 11) to depend on the signals $\overline{\text{TF Inhibit}}$, line 1107, and $\overline{\text{Single Step}}$, line 1108. The first of these two inputs again relates to operations with a Processor 107, and it need only be stated that this level will be low while Processor 107 is in an output mode to prevent manually-initiated Special Skip operations, because a branch instruction involving a code for switching the readers might be generated and erroneously-initiated skipping would caused sensing of the wrong set of information. The second input, line 1108, is present to prevent enabling of TF multivibrator 113 through And gate 1106 when the system is in the Single-Step mode, details of which will be given later. Note that since all three inputs will be high so long as either reader 104 is on, the multivibrator 113 will be enabled continuously and will therefore free run at 30 c.p.s.

In the example chosen, the first pulse from multivibrator 113, shown at column 1 of FIG. *5a* (row labeled "Transfer"), will enable sensing of the code in Reader 2, since this reader is on, through And gate 601 in FIG. 6 (assuming that a Processor 107 is not coupled or is not in an output mode, if coupled), by putting a high level on line 214 of Reader 2 (see FIG. 2). With Reader 2 enabled, the presence of a control code in the respective tape 202 will be detected by means of Or gate 115 in control logic 111 of FIG. 1. An output from Or gate 115 indicates that the system need not await completion of typewriter action before responding to the code sensed and that Reader 2 may be stepped to the next code position of its perforated paper tape 202. There the nature of the code will again be interrogated to determine whether there should be immediate response or deference to the completion of the typewriter action in process. The means for this is shown in FIGS. 7 and 8, where it is seen that code information from the channels is passed through a Control Decoder circuit 116 to send signals over a particular output line to the appropriate control flip-flop for turning on the device corresponding to the code.

"Code Control On" code is the first code in tape 202, as indicated by the abbreviation "CC On" in column 1, row *d* of the example of FIG. 5. This code requires holes in channels 3, 4, 5 of tape 202 and its presence will result in turning off the corresponding transistors 212. As a consequence, at the input lines 215 to information channels 108 (see FIG. 3) the voltage will drop on channels 3, 4, 5; i.e. $\overline{\text{Ch3}}$, $\overline{\text{Ch4}}$, and $\overline{\text{Ch5}}$ (complements) will be FALSE. In such case, the voltage on the Ch3 Out, Ch4 Out, and Ch5 Out lines 302 (not shown, but indicated) of information channels 108 will go high because of the inverters 315. The $\overline{\text{Ch3}}$ Out, $\overline{\text{Ch4}}$ Out, and $\overline{\text{Ch5}}$ Out lines 302′ will be correspondingly low. By virtue of an output from And gate 701 in FIG. 7, caused by sensing of the "Code Control On" code, there will be a high input on line 702 to Or gate 115. The resultant high level on output line 703 from gate 115 (also the low level on inverted output line 703′) will establish that the code sensed is a control code. The output on line 703 is the basis for the pulse in column 1 of the row labeled "Control," FIG. *5e*, this pulse being in synchronism with the transfer pulse, FIG. *5a*. The output of And gate 701 also appears on line **704*a*, one of four inputs to a pulse gate 801 (FIG. 8). An output on line 806 from gate 801 will turn on Code Control flip-flop 903 in FIG. 9. Of the other three inputs to pulse gate 801, the two on lines 302′ and 707*a* are complementary outputs (the latter a combination of such outputs) from information channels 108, and serve for proper decoding of the "Code Control On" code. The other input on line 1003 is developed in FIG. 10, and indicates that a reader is "on" and that information is not being "skipped" (in the latter case, control codes obviously should be ignored). All these inputs being high in this example pulse gate 801 is armed, and when a clock signal is generated on line 1109 (see FIG. 11) at the end of the Transfer pulse, pulse gate 801 will give an output and flip-flop 903** (FIG. 9) will be set. The timing for this is illustrated in FIG. *5g*.

During this same Transfer pulse period, the "Control" signal on line 703 from Or gate 115 is supplied as an input (see FIG. 6) to another Or gate 602 and gives rise to a pulse on a line 603. The pulse on line 603, together with a high level on line 914 from Reader 2 flip-flop 902 (indicating that Reader 2 is on) and the Transfer pulse on line 1112 will result through And gate 604 in stepping Reader 2 (assuming again that a Processor 107 is not coupled or not "busy," if coupled) by means of a high level on its line 208, as described earlier with respect to the reader drive means of FIG. 2.

Thus, a second Transfer pulse, shown at the second column (only every fifth column being designated) in FIG. 5, is initiated about 25 ms. after the end of the previous pulse. In the example chosen, the next code (see FIG. *5d*, second column) is the "Auto-Print On" code, indicated by "AP On" in FIG. *5d*, which enables the output section of typewriter 100 (Printer Decoder 102). The Auto-Print On code, which has holes in channels 3, 4 and 6 of tape 202, is a control code also and the operational steps described above will be followed identically, except that different decoding gates will be active and that a different pulse gate will be triggered to turn on Auto-Print flip-flop 904, shown in FIG. 9.

At the third Transfer pulse (third column of FIG. *5a*), the code in Reader 2 for the example of FIG. *5d* is the letter A. Through And gate 605 in FIG. 6, at the start of the Transfer pulse, in the presence of the high level on the Reader On line 1001 and the high level on Auto-Print line 905 (since the Auto-Print flip-flop 904 is set, as described above), there will be a high output owing to the presence of a high output on line 1110, developed through And gate 1111 in FIG. 11. The output of gate 1111 will be high because: Decode Busy One-Shot 114 has not been triggered; the code sensed is an alphabetic code, not a control code; Reader 2 is not skipping over information; and a Transfer pulse is being emitted by multivibrator 113. The output from gate 605 passes through a buffer 606 to amplify the power of the signal delivered to line 607. The amplifier (buffer 606) also inverts the signal and thus the output on line 607 is a negative level when TRUE. The output of line 607, called the Typewriter Decode Strobe signal, goes to two places in FIG. 3:

(1) It puts a negative voltage on a first terminal of the coil (not shown) of each relay 303, the second terminal of which is at ground if the corresponding channel has information in it and at a negative voltage if the channel does not. Thus, the relays in the channels bearing information will operate, closing and opening various ones of their associated contacts in the usual manner to establish a particular path through relay tree 304; and (2) It passes through a differentiating circuit 307, such that the positive-going pulse from the trailing edge of the negative signal triggers a pulse gate 308 previously armed by the transfer pulse from multivibrator 113 on line 1112. The output of pulse gate 308 in turn triggers a one-shot (monostable multivibrator) 309, which gives a high (0 volts) output for 22 milliseconds. The output of multivibrator 309 is connected to a terminal 305 of the relay tree 304, the other terminal 306 of which is at −24 volts. Current then flows through the path established by the relays and thus results in operation of the particular solenoid 301 selected according to the code sensed in the reader tape 202, the "A" code in this instance. To guard against opening contacts of the relay tree 304 while current is flowing, the 22 millisecond output of the Decode One-Shot 309 is also fed back to the Typewriter Decode Strobe circuit at the input to buffer 606 via a line 310, connected in parallel with the output line from gate 605 (FIG. 6). The extension of the Decode Strobe signal due to this feedback is illustrated in columns 3 to 5 in the timing diagram, FIG. *5i*.

At the end of each TF pulse from Transfer Multivibrator 113 (see FIG. 11), through clock shaper circuit 1113 a 500 microsecond pulse is generated. This pulse, appearing on line 1114, is termed the "Special Skip Off" clock and is used for purposes to be described in detail subsequently. At the same time, the pulse is passed through a voltage-dividing circuit 1115 to produce a pulse called "Clock," having the same duration but smaller amplitude. The "Clock" pulse, as mentioned previously, appears on line 1109 and is used to trigger the pulse gates in the system, generally. For simplicity, both pulses are represented by a single set in the timing diagram, FIG. *5b*.

Through Or gate 602 (FIG. 6), during TF time a high level is present on line 603, though this level is now due to a high level on the $\overline{\text{Decode Busy}}$ input line 1116′ rather than a high level on line 703, since the code presently being sensed is not a control code. As before, there will be an output on line 208 and Reader 2 will step to the next code position.

Turning back to consideration of the example in the timing diagrams, FIGS. *5a–5r*, it will be seen that at the end of the third TF pulse, during which an alphabetic character code was sensed, the level Decode Busy (shown in FIG. *5f*) went high. The cause of this is shown in FIG. 11. Pulse gate 1117 in that figure is armed under the conditions of the example because the levels on "Reader On" line 1001*b* and "Auto-Print" line 905 are both high and, furthermore, the level on line 1110*a* from And gate 1111 is high because Decode Busy One-Shot 114 is not on (the voltage on line 1116′*b* therefore being high), the code sensed is not a control code ($\overline{\text{Control}}$, line 703′ of FIG. 7, therefore being high), Reader 2 is not skipping ($\overline{\text{Skip Logic}}$, line 1004′ developed in FIG. 10, therefore also being high), and multivibrator 113 is emitting a TF pulse on line 1112*a*. Accordingly, the appearance of a clock pulse on line 1109 will trigger pulse gate 1117 and thus, in turn, trigger Decode Busy One-Shot 114.

Occurrence of a fourth TF pulse will produce a high level on line 214 of Reader 2, through gate 601 of FIG. 6 as explained previously. The code in tape 202 (letter B) will be sensed, but there will not be a reader step at this time because none of the inputs to Or gate 602 is high (the Decode Busy One-Shot being on, $\overline{\text{Decode Busy}}$ line 1116′ is low; the code being an alphabetic, $\overline{\text{Control}}$ line 703 is low; the typewriter being enabled, $\overline{\text{Auto-Print}}$ line 905′ is low—note that an Or gate combination of the outputs of both printer control flip-flops is needed if there is a slave printing unit; and the reader not being in a skip mode, Skip Logic line 1004 is low also). Thus, all that occurs at this fourth pulse time is that the code at sensing station 203 of Reader 2 (letter B) is sensed to determine its nature. Similarly, at the fifth TF pulse there will not be an output from Or gate 602 and Reader 2 again will not step. Decode Busy One-Shot 114 will return to its normal state sometime between end of the fifth and start of the sixth TF pulse, the latter arriving about 100 milliseconds after start of the TF pulse (third) during which the code for letter A was sensed in tape 202. As previously described, decoding Relays 303 operated and a pulse was sent over the path including the "A" solenoid 301, thereby operating typebar A (FIG. 3), an operation which is completed in less than 100 milliseconds. Accordingly, upon advent of the sixth TF pulse, there will again be a sensing of the code for the letter B, but this time there will also be an output from Or gate 602 because the level of $\overline{\text{Decode Busy}}$ line 1116′ will again be high. There will then be an output on Reader 2 Step line 208 and a Decode Busy output on line 1116, as well as a Typewriter Decode Strobe output on line 607 for operation of the "B" solenoid 301 in the manner explained for printing the letter A and with timing as shown in FIGS. *5j*, *5f* and *5i* respectively.

At the seventh TF pulse, the Punch On code is present at the sensing station 203 (see FIG. *5d*). The holes in channels 3, 4 and 7 which represent this code assure an output from Or gate 115 because of an output from And gate 706 through line 708 (FIG. 7). The resulting output on line 703 will produce a reader step (see FIG. 6) through Or gate 602 and And gate 604 via line 603 even though Decode Busy is high (indicating that a typewriter operation is in process). The output from And gate 706 (FIG. 7) is also sent to a pulse gate 802 (FIG. 8) via line 708*a*. The other inputs to pulse gate 802 will also be high during this TF period so there will be an output on line 803 at clock time which will enable the punch by turning on Punch flip-flop 906 shown in FIGURE 9. The timing is shown in FIGURE *5p*. Similarly, at the eighth TF pulse, a delete code—consisting of holes in channels 1 through 7—is sensed in tape 202 of Reader 2. By means of And gate 311 connected to the lines 302 of information channels 108, the presence of the Delete code or the Special Skip Off code, described later, will be detected. The output of gate 311 being provided as another input to Or gate 115, these codes too will give rise to a high level on "Control" line 703, with the result that Reader 2 will be stepped once again. It should be noted that a blank code—the absence of any holes in the tape except the feed hole, of course—is also treated as a "Control" code so that no time is wasted holding up the reader step for these codes. Thus, it is evident from FIG. 5 that this invention affords means for sensing and responding to two control codes in the space of time that a typebar operates.

FIGURE 5, columns 9 through 11 and 15 through 22, further illustrates how an alphabetic code can be sensed and utilized while a typewriter operation is in process. Only the latter part of the example will be presented in detail, because the time-saving achieved with the latter is the more obvious. Before going into details of this part of the example, consideration may be given to the rerecording of selected portions of the data by means of Punch 106. The logic concerned with punch operation is shown in FIG. 12. There it is seen that the output of an And gate 1201 passes through an amplifier 1202 to give an output on a line 1203, labeled Punch Strobe. The Punch Strobe line 1203 is connected in common to one terminal 403 of each of the punch solenoids 401 and the feed solenoid 402 (see FIG. 4). Amplifier 1202 is needed because of the power requirements of solenoids 401 and 402. The note "Negative Level" is appended to the label on line 1203 because buffer 1202 inverts the signal and the voltage on this line is negative when the output is TRUE (in similar fashion to the T/W Decode Strobe output 607). Accordingly, as explained in brief previously, when all inputs to And gate 1201 are TRUE, a negative level will appear on line 1203 connected to one terminal of the feed solenoid 402. Since the other terminal 404 of feed solenoid 402 is always connected to ground, feed solenoid 402 will therefore operate. Whichever ones of the punch solenoids 401 have 0 volts on their other terminals 404 by virtue of the sensing of a hole in a corresponding channel of tape 202 will also operate, of course.

And gate 1201 has three inputs 1112, 907, and 1204. Line 1112 comes from TF multivibrator 113 and will be at a high level whenever a TF pulse is present. Line 907 comes from the set side of Punch flip-flop 906, and will be high whenever Punch 106 has been turned on. Line 1204 comes from an Or gate 1205 connected to three And gates 1206, 1207, and 1208. And gate 1206 provides an output whenever all of its three inputs—Control 703', Skip Logic 1004' and Decode Busy 1116'—are high. And gate 1206 represents the normal control for punching of alphanumerics while the Printer Decoder 102 is enabled. And gate 1207 represents the means for causing the punching of a Control Code when the system is in the "Code Control Off Mode," i.e., Control Codes are not being obeyed. The inputs to gate 1207 are the Skip Logic line 1004', Reader On line 1001, Code Control line 908 and Control line 703. The level on each of these lines must be high in order to give a high output through Or gate 1205 and thus obtain the negative Punch Strobe level on line 1203. The third And gate 1208 makes possible the obtaining of the negative level on line 1203 when an alphanumeric code has been sensed, but the Printer Decoder 102 is not enabled, and the reader is not "skipping," hence the code can be recorded immediately, regardless of the state of Decode Busy One-Shot 114. The four inputs to And gate 1208 comprise Control line 703', Skip Logic line 1004', Reader On line 1001, and Auto Print line 905'. Again the levels on all these lines must be high for a negative level to be obtained on Punch Strobe line 1203. FIG. 5*q* shows the output of line 1203.

Returning now to consideration of Parallel Processing, that is, reading of and response to data on the tape while the typewriter is "busy," the negative Punch Strobe pulse FIG. 5*q* synchronized with the ninth TF pulse in FIG. 5*a*, is obtained through And gate 1206 of FIG. 12 since all inputs to this gate are high (note rows *e* and *f* of FIG. 5, inverting the values where appropriate). The Delete Code at the preceding (eighth) TF pulse and the Auto Print Off Code at the succeeding (tenth) TF pulse do not give rise to a Punch strobe because these codes are control codes. Thus, at these TF times there is a low input to And gate 1206 on line 703', and a low input to And gate 1207 on the Code Control line 908' (since Code Control flip-flop 903 is set). The next three codes at the eleventh through thirteenth TF pulse periods and the four at the seventeenth through the twentieth pulse periods are alphanumerics and would normally not punch while the Decode Busy signal (FIG. 5*f*) is high during the Carriage Return movement initiated in column 15 (FIGS. 5*a* and 5*d*). And gate 1206 then does not provide a punch strobe signal, but And gate 1208 effects the punching in this case, as evidenced by the Punch Strobe pulses in columns 17 through 20 of FIG. 5*q*. The converse result with Auto-Print flip-flop 904 on is shown at the twenty-sixth TF pulse, where the "5" code is sensed, but is neither printed nor punched the first time it is sensed because the Decode Busy One-Shot has been triggered, as shown by the signal on line 1116 (see FIG. 5*f*).

As described in the foregoing, during carriage movements in the typewriter a considerable amount of time is available for sensing control codes and even alphanumeric codes, should these be for utilization by equipment other than the typewriter. In order to read a succession of these last at such times, one must again look to the circuitry in FIG. 6 for the necessary means. Here, it will be seen that one of the inputs into Or gate 602 is the line 905' labeled Auto Print (this level is developed in FIG. 9). In the presence of a high level on line 905', one will get an output on line 603 and therefore Reader 2 will step during the seventeenth through twentieth TF pulses from multivibrator 113.

In summary, then, Or gate 602 permits stepping a reader 104 to a new data position and acting upon the new data not only when the typewriter decoder 102 is not busy, but also when the typewriter is in a non-responsive state, or a control code is being sensed in reader 104, or reader 104 is in some form of skip operation. Provision of the latter three controls makes possible the novel "Parallel Processing" of this invention.

*Special skip timing*

Another instance of the application of special timing is in the simultaneous two-reader operation of the writing machine herein disclosed. As is usual, only one reader at a time can supply character and control data to the information lines in the machine; that is, only one reader can be "On." This follows because only a "Switch" code (Chan. 2, 3, 4) can be punched in a tape, there being no provision for direct code selection of flip-flop 901 or flip-flop 902. Accordingly, as seen from FIGURES 7 and 8, when the "Switch" code is sensed there are outputs on lines 709 and 710. These outputs (together with outputs on other lines shown in FIG. 10 and assumed present for purposes of this discussion) will result in the setting of the reset one of flip-flops 901 and 902, and the resetting of the set one of these same flip-flops. The result will be the switching of control from one reader to the other. As an example, if Reader 1 is in control, there is an output on line 913 from the set side of flip-flop 901. Line 913 is one input to a two-input And gate 1005 (FIG. 10), the other input to which is normally present since a high level there indicates that neither reader is skipping and that the system is in "Code Control", i.e. responsive to Control Codes such as "Switch." Accordingly, the output on line 913 causes an output on line 1006 from And gate 1005. From FIGURE 8, it is evident that line 1006 supplies the pulse gates 807 and 809, the output lines of which, 808 and 810 respectively, are inputs to the reset side of flip-flop 901 and the set side of flip-flop 902. The other inputs to pulse gates 807 and 809 come from lines 709, 710 and the Ch6 line 302', all of these having a high level when the "Switch" code is sensed, and thus the flip-flop states are reversed to pass control from one reader to the other. Similar circuits can be traced for the case where Reader 2 is "on" when a "Switch" code is sensed. Further, with respect to manual control of the readers 104, though not shown, the circuit from a given reader control key switch to the respective flip-flop 901 or 902 passes through an And gate having as an input the level Reader On—developed on line 1001' of FIGURE 10. Hence, depression of either reader control key while the other reader is in control will have no effect, again permitting only one reader to be "On" at any given time.

At times, control of the system is about to be passed from one of the readers 104 to the other, but the other of the readers 104 has been stopped with its tape 202 at a position where the desired information is not present. It may therefore be necessary to skip over a large section of the tape 202 in the other reader. If the skipping were done serially with respect to operation of the first reader, additional time would be wasted. It is well known to provide for skipping the other reader in a search for the start of desired information while the first reader is completing the sensing of information on its tape 202. Prior art structures have performed this skipping by providing dual circuits for the readers and separate timing generators to allow control of the system by one reader, while simultaneously performing the above-mentioned search. According to the structure of this invention, however, dual circuits and separate timing generators are not needed for this operation—termed "Special Skip" hereinafter. The same circuits are utilized, but are enabled for special sensing of the codes in the nominally "off" reader 104 at a different time than that for normal sensing of codes in the "on" reader 104, so that the "Special Skip Off" code may be detected as the tape 202 in the "off" reader 104 is otherwise idly advanced.

Structure for performing the above-described "Special Skip" is shown in terms of means for a separate scanning of Reader 1 information after scanning Reader 2 information during normal Reader 2 operation, although "Special Skip" can occur with neither reader "on" or even with Reader 1 normally enabled. The explanation based on the first case is as follows. When a "Special Skip On" code (Chl. 3, 4, 7 and 8) is read in Reader 2, this control code will pass through Or gate 115 (FIGURE 7) to give the "Control" signal on line 703, and through the Decoder circuit 116 to give an output on line 804 through a pulse gate 805 (see FIGS. 7 and 8) triggered by the clock pulse on line 1109. Line 804 is connected to the set side of a Special Skip flip-flop 909 (FIG. 9) which will therefore turn on at clock time (see column 22, FIG. 5*r*), giving a high level on the Special Skip output line 910. As shown in FIG. 11, the TF multivibrator 113 will be enabled through And gate 1104 as well as by the normal gate 1106 (the purpose of And gate 1104 being to permit Special Skip operation with neither reader "on," under circumstances described subsequently). At the next TF period, in the presence of the high level on Special Skip line 910, the TF pulse through And gate 608 and Or gate 609 (see FIG. 6) will initiate the Special Skip operation by stepping Reader 1.

During the "Special Skip" operation, sensing of the codes in the Reader 1 tape 202 must not depend upon the Reader 1 being "on," i.e. enabled in the normal fashion, and further the timing must be different since Reader 2 may be "on" and a conflicting output from Reader 1 at TF pulse time cannot be permitted. In view of this, the output on line 1114 from Clock Shaper 1113 (FIG. 11) is used to enable the sensing of codes in Reader 1 through And gate 610 and Or gate 611 (FIG. 6). Further, the output on line 1114—called the Special Skip-Off Clock—is differentiated, as will be described, such that the trailing edge of the pulse on line 1114 will determine the ttming of the pertinent pulse gates.

Stepping of Reader 1 and sensing of the information in its tape 202 continue until a Special Skip-Off Code (Chs. 1, 2, 4, 5, 6, 7, 8) is located in the information channels, at which time there is an output from And gate 311 (see FIG. 3), previously mentioned. Further, the ouput of this gate, together with a high level on $\overline{\text{Ch3}}$ input, line 215*a*, (thus distinguishing from the Delete Code which has an output on all channels including Ch3) arms a pulse gate 312. Pulse gate 312 (similar to pulse gate 1311 described subsequently in the section on "Typical Circuits" except that it is a positive logic pulse gate and has one more input) has an R–C circuit which differentiates the Special Skip-Off Clock pulse. Because of the presence of an inverter 314, the differentiated output presents a positive spike to the anode of the isolation diode (not shown but similar to diode 1603 of pulse gate 1311 except for polarity) at the trailing edge of a Special Skip-Off clock. The voltage-divided 314*a* limits the amplitude of the spike such that it forward-biases the isolation diode of pulse gate 312 only when the gate is fully armed, i.e. when both inputs are present. Conduction of the isolation diode then results in a signal output on line 313 at the trailing edge of the Special Skip-Off clock. This output resets the Special Skip flip-flop 909 (see FIG. 9). When the set side of flip-flop 909 goes low, And gate 608 (FIG. 6) no longer enables the Special Skip search, i.e. the independent stepping of Reader 1 ceases. The Del/Special Skip-Off signal also goes to Or gate 115 in FIG. 7 via line 316 and gives an output on the "Control" line 703 when the Special Skip-Off code is sensed in tape 202 of Reader 1 by the Special Skip Off Clock—as can be seen in column 29, FIG. 5*e*.

It is evident from the foregoing that by virtue of the enabling of multivibrator 113 by And gate 1104 (mentioned previously) and the stepping of Reader 1 through And gate 608, Special Skipping can proceed with neither reader "on." In other words, Special Skipping with neither reader "on" may be instituted by setting flip-flop 909 through a manually-operated switch or it can arise because Reader 2 may be turned off upon sensing a Stop Code in its tape 202 before Reader 1 has sensed the Special Skip-Off code in its tape 202.

It should be noted that FIGURE 6 discloses structure for a "Special Skip" limited to idle advancement of Reader 1 while Reader 2 is in control of the system. It is obvious that similar gating could be provided together with appropriate additional inputs from lines 913 and 914, to permit idle advancement of Reader 2 while Reader 1 is in control of the system. In this fashion the tape 202 in whichever reader was disabled could be brought to a specific position while the enabled reader is in control of the system. Such concomitant operation of either reader when nominally "disabled" is considered an obvious variant of the disclosure and therefore falls within the scope of the invention.

*Field Control timing*

As used herein, the term "Field Control" refers to means for programmed carriage-position control of system components, i.e., turning on or off various control elements of the system at different carriage positions. The mechanical structure is only sketched herein, but the unit can be of the type shown, for instance, in either of U.S. Patents 2,784,785 or 3,120,301. The latter form is the preferred one and only the pertinent structure will be repeated here. The preferred Field Control structure comprises (see FIG. 13) an eight-channel perforated paper tape 1301 (similar to reader tape 202) secured to an electrically-conductive tape carrier plate 1302 mounted on the typewriter carriage (not shown). Eight appropriately mounted contacts 1303*a–h* engaging tape 1301 complete a corresponding circuit wherever a hole 1304 is programmed in one of the eight channels of tape 1302. In the system of this application, Field Control is used only during manual entry to turn off Punch 106 and/or turn on a Reader 104, when holes 1304 are detected in corresponding channels of field control tape 1301. Obviously, Field Control could be used for turning on or off other devices, such as additional punches or a slave typewriter. Operation of Field Control is inhibited when a reader is on or when the carriage is in a reverse motion. The restriction to manual entry is not an inherent one, and the intent is to cover automatic operation under reader control even though the presentation is directed toward manual entries.

The novel aspect of the structure is the timing of the field control, that is, a Field Control command does not immediately become effective upon entry into a carriage position in which a hole is programmed, thus distinguishing over prior art units. One reason for this difference is that it has been found an undersirable source of operator error to permit activation of a Field Control command by manual movement of the carriage into that program position. Accordingly, depression of any one of the keys on the keyboard 120 is required to activate the Field Control command. The Field Control logic is shown in FIG. 13. Pulse gate 1305 is used to turn off the punch 106 and pulse gate 1306 is used to turn on Reader 1. (Similar circuits, not shown, could be used to control Reader 2.) The clock input to each of these pulse gates comes from a circuit described below. Five conditions are necessary to turn off punch 106, these being: the punch must be on, Field Control (flip-flop 911) must be on, a hole 1304 must be sensed in the punch control channel (FC–Ch1) of field control tape 1301, a Field Control Enable One-Shot 1307 (also described below) must have been triggered, and a pulse must be present to trigger armed pulse gate 1305, thus giving an output on line 1308 to turn off punch flip-flop 906 (FIG. 9). Similarly, four conditions must exist for turning on Reader 1: Field Control (flip-flop 911) again must be on, an appropriate hole 1304 (located in Ch3) must be sensed in tape 1301, the Field Control Enable One-Shot 1307 again must have been triggered and a pulse must be present to trigger armed pulse gate 1306, thus giving an output on line 1309 to turn on Reader 1 flip-flop 901 (FIG. 9). Note that when hole 1304 is sensed in the Reader 1 control channel (FC Ch3), an output is also sent (as shown in FIG. 13) to the keyboard lock circuit via line 1317*a* for reasons which will be discussed subsequently.

As explained previously, operation of each alphanumeric and function control key on the keyboard 120 results in production of a TF pulse on line 1112. The clock occurring on line 1109 at the end of this TF pulse could be used to trigger the field control pulse gates 1305 and 1306 except for one factor. As shown in FIG. 14*c*, under what will be termed "burst-speed conditions," achieved by successive depression of two keys at a rate considerably in excess of that which can normally be sustained, it would be possible to move the carriage through a position in which a field control hole 1304 is programmed without turning on (or off) the corresponding unit because the second TF pulse and the sensing of the field control hole 1304 might not occur in coincidence, as shown in FIG. 14*c* by the relative locations of the end 1401 of the TF pulse and the start 1402 of the output from a contact 1303 sensing a field control hole 1304. FIGURES 14*b* and 14*d* show comparable data for normal field control cycles. Accordingly, the Field Control Clock Circuit shown within the dashed-line block 1310 in FIG. 13 is used to produce a series of pulses 1403 (at a rate of about 2,000 cycles per second) for a duration of about 17 milliseconds after the end of TF. The pulses 1403, called Field Control Clocks, are used to trigger the field control pulse gates 1305 and 1306 and turn off or turn on the respective control flip-flops 906 and 901. This series of clocks 1403 thus ensures that any holes 1304 in the field control tape 1301 will be detected and responded to regardless of the speed of carriage movement, including that ensuing from depression of successive keys at a "burst speed" rate. As seen in FIG. 13, the Field Control Clock Circuit consists of a pulse gate 1311 to turn on the Field Control Enable One-Shot 1307, which remains on for about 17 milliseconds. Pulse gate 1311 is triggered at the end of the TF pulse on line 1112 because of the differentiating effect of the pulse gate circuit, as described later. The voltage-dividing circuit shown in symbolic form at 1321 is present for the purpose of limiting the amplitude of the input pulse to prevent triggering of pulse gate 1311 when the gate is not armed. The output of One-Shot 1307 provides one of four conditions for enabling the operation of a four-layer diode oscillator 1312 which furnishes the actual Field Control Clocks 1403. The series of clock pulses 1403 therefore will only last as long as One-Shot 1307 is on. Because this One-Shot is turned on at the end of TF and lasts for about 17 milliseconds, it is evident that the time for supplying clocks 1403 is not long enough to extend into the next carriage position, normally reached in a minium of 40 milliseconds on the machine disclosed, since such might result in turning on a control flip-flop too soon. As stated previously, operation of oscillator 1312 depends, in addition to the output from One-Shot 1307, upon the presence of other levels indicating that the carriage is not being returned to the initial columnar position on the document in preparation, nor is the carriage being backspaced, and reader is not "on"—this last assured by the level $\overline{\text{Decode Busy}}$ on line 1116'. These other inputs are combined in logical "And" fashion (depicted by And gate 1313) with the Field Control Enable One-Shot Output, line 1314, to control operation of oscillator 1312. The And gate structure is only logical, it is not a physical And gate as will be seen later in the discussion of typical circuits.

Another timing problem relates to the turning on of Reader 1 by means of Field Control, as mentioned earlier, and arises from the fact that when a reader 104 is on, the keyboard encoder 101 should be locked to prevent manual entries while the reader 104 controls the system. However (see FIG. 13), the lock means has an inherent time delay in its operation, being dependent upon operation of a solenoid 1320. Because of this delay and because the field control program hole 1304 to turn on Reader 1 will not be acted upon until one of the keys 1322 in the input keyboard 120 is depressed, there is an interval—as shown by the dotted line data 1404–1408 in FIG. 14*a*—during which it might be possible to depress a second key (action initiated at 1404) before the keyboard can be locked (action initiated at 1404). A "keyboard lock anticipation circuit" is therefore necessary to prevent erroneous depression of this second key. The anticipating circuitry comprises a normally-open switch 1315, operated by all character keys, and a pulse gate 1316 armed by a high level on a line 1317 from a two-input And gate 1318. The output of gate 1318 will be high when Field Control flip-flop 911 (FIG. 9) is set (level on line 912 is therefore high) and a hole 1304 is being sensed by the contact 1303*c* in the "Reader 1 On" channel of Field Control tape 1301. The voltage step obtained upon closure of switch 1315 is differentiated by means of a circuit shown symbolically at 1326, providing a pulse which triggers gate 1316 to give an output to a Field Control Keyboard Lock One-Shot 1319, the firing of which releases a normally-operated Keyboard Unlock solenoid 1320 in time to prevent a second key depression. The timing is as shown in FIGURE 14*a*, where the locking 1409 of keyboard 120 occurs in less than 30 milliseconds and precedes any potentially succeeding manual key depression 1404 by a minimum of one millisecond to assure error-free operation. Thus, an erroneous output 1405 from the TW Encoder 101 and a TF pulse 1406 from multivibrator 113 are prevented. The duration of the output from the Field Control Keyboard Lock One-Shot 1319 is long enough to allow for the normal keyboard locking operation to become effective. This normal operation is initiated by turning on a reader 104, or other circumstances, as shown in FIGURE 11, where a high output on Reader On line 1001 (developed in FIGURE 10) passes through Or gate 1119 to generate the Keyboard Unlock signal on line 1120 by means of an inverter 1121. The inverted output will thus take effect before One-Shot 1319 returns to its normal state, as shown in FIGURE 14*a*.

As indicated above, solenoid 1320 is referred to as a Keyboard Unlock solenoid. The reason for this is that in the structure disclosed, the keys 1322 of keyboard 120 are locked by a spring-urged bail 1323 which underlies the ends 1324 of the key levers 1322 when solenoid 1320 is *not* energized. The function of the output of Field Control Keyboard Lock One-Shot 1319 and the keyboard unlock signal on line 1120 is therefore to open the circuit to solenoid 1320, releasing it and thus allowing spring 1325 to move bail 1323 into position to prevent depression of any of the keys 1322. Accordingly, these two signals are merged at And gate 1326 and both must be high for the solenoid to operate. If either signal is low, the output of And gate 1326 and ergo the voltage on the input terminal of solenoid 1320 will be correspondingly low, and the solenoid will release to lock keyboard 120 as described above. It follows, of course, that Field Control input to And gate 1326 must come from the reset side of One-Shot 1319, which gives a high output when the One-Shot is in the rest state and a low output when the One-Shot is triggered.

*Single-step punch tape advance*

Another variation in the timing provided by this invention relates to the idle advancing of the medium in a recording device. In prior art devices such idle advancing of the medium is performed self-synchronously and for a period corresponding to the duration of operation of a manually controlled key or switch. Advancing or "feeding" the medium through a single recording position is then a matter of operator skill. Accurate feeding of a perforated paper tape is essential to the preparation of a field control tape 1301, because of the manner in which the field control tape is mounted in the preferred structure (described in detail in U.S. Patent 3,120,301). To avoid the repetitious work involved in preparation of a new tape caused by operator error in spacing the mounting holes, single-step feed of the tape in the punch is needed. Accordingly, one aspect of this invention provides timing means which normally supply timing pulses as long as a punch-tape feed key is depressed, but block this action after a single timing pulse has been emitted when the system is in "Single-Step" mode. The means for this are shown in FIG. 11.

In the "Single-Step" mode of operation of a reader 104, the Single-Step control key (not shown) operates a transfer switch 1122 when the key is depressed part way to a latching position. In this position, switch 1122 transfers contact and applies a ground potential to a line 1123 which is one of the inputs to an Or gate 1124. The other input to this gate, line 1001', comes from FIGURE 10 and is the inverse of the output from Or gate 1002. Line 1001' thus has a high output when neither reader 104 is on, as can be seen from the logic diagram of FIGURE 10. Returning now to FIGURE 11, through Or gate 1124, the Single-Step signal will partially arm an And gate 1125. The other two inputs to And gate 1125 come from Or gates 1126 and 1127, the latter through a "delay" network 1128, an RC circuit (comprising a capacitor in parallel with a resistance, as is well-known) introduced for the purpose of compensating for bounce in manually-operated key contacts. Network 1128 provides a delay of about 4 ms. Or gate 1126 has an input from the reset side of Decode Busy One-Shot 114, this input being high whenever the One-Shot is in the rest state. The other input to gate 1126 need not be considered at this time since it comes from a source giving a high output when the system is not in the Single-Step mode, a condition not met under the circumstances being discussed. As to Or gate 1127, this gate has two inputs 1504 and 1130. The first of these inputs, labeled Encoder Go, is developed in FIGURE 15, where it is shown to be merely the differentiated and inverted output of line 1501, the latter providing a negative level "Encoder Out" whenever a key depression causes closure of one of the switches 1502. The differentiating circuit is needed because only one pulse from the multivibrator 113 is desired for each key depression. The second input, line 1130, is the output from an Or gate 1131 having three input lines 1132, 1133 and 1134. Line 1132 has a high output when the Single Step key closes a second switch 1135 upon further depression of the key from latched position. Closure of switch 1135 connects line 1132 to ground, thus putting a ground level on And gate 1125 through Or gates 1131 and 1127. Depression of a control key labeled "Punch Feed" closes a similar switch 1135 to put a ground level on input line 1133 of Or gate 1131. Lastly, depression of any of the control keys (identified, but not shown) will similarly close associated switches 1135 to put a ground level through Or gate 1136, which supplies one of three inputs to And gate 1137, the other two inputs being line 1001' from $\overline{\text{Reader On}}$ (FIG. 10) and $\overline{\text{Decode Busy}}$ via line **1116'*b*. If lines 1001' and 1116'*b* are both high, then And gate 1137 will give a high output on line 1134** whenever a control key is depressed.

Of the three inputs to Or gate 1131, the first two are of interest in the present discussion of the Single-Step mode of reader operation and the modification in punch-tape advance achieved when in this mode. When the Single-Step key has been brought to latch position, the normal reader cycling stops because the high level on line 1108 is removed, with the result that And gate 1106 no longer supplies a high input to Or gate 1101, and therefore multivibrator 113 is no longer enabled. At the same time, as explained above, the level on line 1123 will go high, providing one high input to And gate 1125 through Or gate 1124. Further, assuming that the previous output from the active reader 104 was completed, Or gate 1126 will supply another high input to And gate 1125, since the level on line **1116'*c* from the normally-on side of Decode Busy One-Shot 114 will be high. Note that latching of the Single-Step key also removed the high level from line 1108*a*, which is the second input to Or gate 1126. Thus, in Single-Step mode, And gate 1125 is armed only when Decode Busy One-Shot 114 is in the normal state. In this respect, FIG. 11 shows that a high output from Or gate 1131 will arm a pulse gate 1138 via line 1130*a*. Pulse gate 1138 is connected to Decode Busy One-Shot 114. Accordingly, as described previously, pulse gate 1138 will be triggered by the clock signal appearing on line 1109 at the end of the TF pulse from multivibrator 113. The clocked output from pulse gate 1138 in turn will trigger One-Shot 114 and the change in state of this one-shot will remove the high level on line 1116'*c* into Or gate 1126 such that TF multivibrator 113 is disabled after emitting one pulse. Since One-Shot 114 is a monostable device, it would normally return to the stable state after a fixed period (72 milliseconds in the embodiment disclosed), so additional circuitry is needed to prevent this return. The output of Or gate 1131 (through which a high level is obtained when the Single-Step key is depressed) also goes to an Or gate 1139, the output of which is connected to a two-input And gate 1141. The other input to And gate 1141 comes from the output (off-normal) side of One-Shot 114. The One-Shot now being triggered, as described above, the output from Or gate 1131 will be passed by And gate 1141 to hold One-Shot 114 "on" as long as the Single-Step key is held down and thus prevent any TF cycles beyond the first. A voltage divider 1142 is provided between And gate 1141 and Decode Busy One-Shot 114 to adjust the holding voltage such that a 10 millisecond delay occurs in the return of One-Shot 114** to its normal state when the key is released.

The foregoing has briefly described the Single-Step operations of a reader 104. The Punch Feed key (not shown) also closes a similar switch 1135 to supply a high level on line 1133 to Or gate 1131, mentioned before. Line 1133 is in parallel with line 1132 described above, hence depression of the Punch Feed key when the Single-Step key is in latch position will have the same result as that occasioned by further depression of the Single-Step key—namely, there will be emission of one and only one TF pulse by multivibrator 113. The details will not be repeated, as they are identical to those described for the Single-Step key. In contrast, if the Single-Step key were not in latched position, the input to And gate 1125 from Or gate 1126 would always be high because of a high input on line **1108*a*, the $\overline{\text{Single Step}}$ level. The input to And gate 1125 would then always be high also, and thus be independent of the state of Decode Busy One-Shot 114. In such case, depression of the Punch Feed key would close its associated switch 1135 to put a high level on input 1133 to And gate 1125 through Or gate 1127 and delay network 1128, as described previously for the Single-Step key in the Single-Step mode. The third, and last, high input to And gate 1125, that from Or gate 1124, would not be provided by a high level on line 1123 from the Single-Step latching switch, but by a high level on line 1001', a level present only when neither of the readers is on as shown in FIG. 10 (feeding of tape while the punch is under control of a reader could be a source of error and is therefore prevented). Because all three inputs to And gate 1125 will be present continuously when the Punch Feed key is depressed under the circumstances described last, the multivibrator 113** cycles repeatedly and emits a number of pulses varying in accordance with the duration of key depression.

*Typical circuits*

As an example of the typical circuits used in this invention, FIG. 16 shows the circuitry used in production of field control clocks and exemplifies a voltage dividing network 1321, a pulse gate 1311, a multivibrator 1307 of the monostable type, and an oscillator circuit 1312 based on a four-layer diode. Each of these elements has been surrounded by a dashed line and appropriately labeled.

Under normal conditions, the One-Shot 1307 is in its rest condition with NPN transistor 1601 off and NPN transistor 1602 on. An input line 1501, normally high and coming from the keyboard encoder 101 (see FIG. 15) keeps the cathode end of diode 1603 12 volts through the equal resistances 1630 of pulse gate 1311 whereas the anode end of diode 1603, connected to the base of normally-off transistor 1601, is at about +3 volts. Diode 1603 is therefore back biased and, since the emitter of normally-off transistor 1601 is at ground potential, transistor 1601 will remain off. With TF multivibrator 113 in the off state, the voltage on line 1112—connected to the anode of an isolating diode 1604—will be at a low negative value of about −24 volts and because of the voltage-dividing circuit 1321, the resistances of which are chosen to keep the voltage on the cathode end of diode 1604 at −7 volts, diode 1604 will normally be back-biased. Depression of an alpha-numeric or "feature" (function control) key causes a typebar or a feature device to operate, closing in turn a corresponding switch 1502 (FIG. 15) connected to a common line 1118, labeled T/W Encoder Inhibit. The conditions for output on line 1118 are shown in FIG. 11. The T/W Encoder Inhibit level on line 1118 (FIG. 11) is the output of a three-input Or gate 1119. The three inputs to Or gate 1119 are Reader On line 1001*a*, Special Skip line 910, and Processor Out, this last being high whenever a Processor 107 is coupled and has begun an output to the Printer Decoder 102. There will be high levels on lines 1001*a* and 910 if either one of readers 104 is on or if the Special Skip flip-flop 909 has been turned on to cause a Special Skip operation of Reader 1. Or gate 1119 will therefore produce a high level on its output line 1118 if at least one of these inputs is high. Closure of one of the switches 1502 in T/W Encoder 101 will then fail to cause a change in the levels of the appropriate input lines 1503 which supply the information channels 108 in parallel with the reader input lines 215, as indicated in FIGURE 3. Conversely, if neither reader 104 is on, nor is Reader 1 in Special Skip mode, nor is the Processor 107 in an output mode, then the level on line 1118 from Or gate 1119 is low. Under these circumstances, when operation of a key results in closure of one of the switches 1502 in encoder 101, the level Encoder Out on line 1501 goes negative to about −15 volts for about 13 to 30 milliseconds (even longer if a feature action is initiated), corresponding to the duration of closure of that switch 1502. This negative voltage on line 1501 now arms pulse gate 1311 (a negative logic pulse gate as seen from the polarity of diode 1603) by decreasing the voltage at the cathode of diode 1603 from about +12 to about +3 volts. About four milliseconds after the key is depressed, closing the corresponding switch 1502 (see FIG. 15), multivibrator 113 is enabled (as explained previously) and the TF pulse on line 1112 triggers pulse gate 1311 as follows. The TF pulse is differentiated by capacitor 1619 (in series with several parallel resistors) so a positive and a negative spike are successively imposed on the armed pulse gate level. Diode 1603, forward-biased by the negative spike at the trailing edge of TF, turns on the Field Control Enable One-Shot 1307 in the following manner: The negative spike to the base of transistor 1601 turns it on, the voltage at collector 1605 then rising to about zero volts. This positive change is reflected across capacitor 1606 to the base of transistor 1602, turning it off and holding it off until capacitor 1606 completes its discharge and starts to charge to the opposite polarity, thereby applying a negative potential to the base of transistor 1602 to turn it on again and return the Field Control Enable One-Shot 1307 to its original state. When the Field Control Enable One-Shot 1307 is turned on, the level "FC Enable," taken off the collector 1605 of transistor 1601 (a diode 1607 being provided for isolation) goes high to approximately zero volts and provides one of the levels for arming the field control pulse gates 1305 and 1306 (see FIG. 13) as described previously. Furthermore, turning on One-Shot 1307 enables the Field Control Oscillator 1312, and thereby controls the interval during which the clocks are generated (assuming that a carriage return or back space operation is not preventing operation of the oscillator, as will be described).

When the Field Control Enable One-Shot 1307 is in its normal state with transistor 1602 conducting, the zero volt level at the collector 1608 of transistor 1602 is applied through diode 1609 and (with a drop in potential) through series resistor 1620 to one terminal 1610 of a four-layer diode 1611. A voltage divider comprising two resistors 1612 connected between a +24 volt supply and ground, and further having their junction connected to the second terminal 1613 of four-layer diode 1611 (through another series resistor 1626), puts about 12 volts on that terminal 1613 of four-layer diode 1611. Capacitor 1614, in parallel with four-layer diode 1611, then charges to +12 volts. A four-layer diode acts like an open switch when it is not conducting, but once its breakdown voltage is exceeded, such a diode acts as a closed switch. The four-layer diode 1611 used in this circuit will not conduct until a potential drop of 20 volts exists across its terminals. Thus, diode 1611 will not break down under the above conditions and will remain as an open switch, the charged capacitor 1614 being unable to discharge. On the other hand, upon triggering the Field Control Enable One-Shot 1307, transistor 1602 (normally "on") will turn off and the voltage on collector 1608 will drop to about −16 volts. Through diode 1609, this voltage is applied to junction 1610 at the base of four-layer diode 1611 (with a drop in potential through resistance 1620 as before). Four-layer diode 1611 begins to conduct when about −8 volts appears on junction 1610 since the +12 volts on the other terminal 1613 of diode 1611 together with the −8 volts on terminal 1610 provides the 20 volt difference necessary for breakdown. When four-layer diode 1611 starts to conduct, capacitor 1614 is discharged. Discharge continues until the potential drop across four-layer diode 1611 is about 3 volts, at which time diode 1611 stops conducting and again acts as an open switch. Capacitor 1614 then starts to charge again and when the potential drop across four-layer diode 1611 again reaches 20 volts, the diode conducts and discharges capacitor 1614 once more. This cycle continues until the One-Shot 1307 returns to its normal state, the input to the anode of diode 1609 then rising to slightly less than zero volts. If the Decode Busy level on line 1116 goes high, then diode 1609 is back-biased such that when Field Control Enable One-Shot 1307 turns on, the change in voltage at the collector 1608 is not sensed by four-layer diode 1611 and there is no cycling. Similarly, if either of the back space or carriage return switches 1617 opens, then the −24 volts is removed from the cathode of diode 1609 and the voltage at this point rises to slightly less than 0 volts, with the result that diode 1609 is again back-biased with respect to One-Shot 1307 when the latter is turned on. Generation of field control clocks will thus be prevented. The 17-volt saw-tooth output from four-layer diode 1611 is coupled across a capacitor 1615 to a voltage divider, the resistances of which are chosen so as to place a lower limit of about −7 volts on the output. Diode 1616 clamps the line to ground thus removing the positive portion of the resulting spikes, therefore the field control clocks are positive-going truncated spikes rising from −7 to 0 volts, the amplitude being limited to prevent triggering of pulse gates 1305 and 1306 when not armed or only partially armed.

The And gates and Or gates used in these circuits are, in general, ordinary diode gates. The logical And expression gate (1313) for enabling oscillator 1312, however, requires the inputs $\overline{\text{Backspace}}$, $\overline{\text{Carriage Return}}$, $\overline{\text{DB}}$, and an output from the Field Control Enable One-Shot. The former part of the logical function in the field control clock circuit just discussed is provided by means 1617 consisting of two normally-closed switches in series, one each of switches 1617 being operated by the carriage return and back space functions of typewriter 100 and being held operated so long as the respective carriage movement is in process. The two switches thus control application of −24 volts to one terminal 1618 of a resistor which forms part of a normal diode Or gate. This Or gate has as input the reset side (colletcor 1608 of transistor 1602) of One-Shot 1307 and the set side of the Decode Busy One-Shot 114. Thus the structure is actually that of an Or gate, but since all inputs are inverted one then has the equivalent of the original logical And structure, Such equivalent structure based on inverted inputs is well known in the art and has been used in this system where appropriate (existing inverted outputs, etc.) for purposes of cost reduction.

The circuits for the transistor flip-flops, i.e. bistable multivibrators (901, 904, 906, etc.) and astable multivibrator 113 are as well-known as those of the monostable multivibrator 1307 described above. They differ from it only in the nature, number and/or location of the circuit impedances. The inverters (315, etc.) are simple, one-stage, common-emitter amplifiers the output of which is obtained from the collector of the transistor, in well-known fashion. The buffers (many of which are used, but are not indicated in the logic diagrams since they have no logic function) are simple, one-stage transistor amplifiers connected as emitter followers, except for buffers 1202 and 606 used between the output gating and the solenoids 401 and 301 of the punch 106 and typewriter 100, respectively. The latter buffers are inverting transistor amplifier circuits having three stages of amplification. The Clock Shaper 1113 comprises an R–C differentiating circuit in combination with an inverter, the R–C circuit differentiates the leading and trailing edges of the TF pulse, but only the latter (negative) has any effect upon the inverter. The R–C circuit output is negative for about 500 microseconds, which determines the duration of the positive going clock pulses.

Typical circuits and design information for these components may be found in "Digital Computer Principles" contributed by the staff of the Burroughs Corporation, McGraw-Hill Book Co., 1962, Chapters 9, 10, and 14; or the "Transistor Manual," contributed by the staff of the General Electric Co., published by the General Electric Co., sixth edition, 1962, chapter 11; or "Transistor Circuit Design," contributed by the staff of the Texas Instrument Co., McGraw-Hill Book Co., 1963.

With respect to the enabling of multivibrator 113, one means for this can comprise a pair of inverters, connected as a two-stage common-emitter amplifier as shown in FIG. 16*b*. Transistor 1621 is normally on, as determined by a low level on line 1140. Whenever the level on line 1140 goes high, transistor 1621 is turned off and the voltage on its collector, connected to the base of transistor 1622 goes negative. Transistor 1622, which has been off up to this time, now turns on and puts a ground level on the emitter 1623 of the normally off transistor 1624 of multivibrator 113. Emitter 1623 has been "floating" up to this time, thus preventing the cycling of multivibrator 113. The multivibrator now begins to cycle, supplying 8 millisecond TF pulses, as shown, until the enabling level on line 1140 goes negative again. At that time, transistor 1621 turns on again and puts a positive voltage on the base of transistor 1622, turning it off. The emitter 1623 of transistor 1624 then floats again and no further outputs are obtained. The enabling circuit may also be thought of as a two-input series DCTL (direct coupled transistor logic) gate comprising transistors 1622 and 1624, a negative input to the base of transistor 1622 controlling the effectiveness of the input signals to the base of transistor 1624. Such a gate is shown in chapter 8 of "Digital Computer Principles," cited above. Transistor 1621 is connected as an inverter, which is needed to provide a negative input to the base of transistor 1622 when the input to the base of 1621 is positive, therefore a TRUE input.

While specific forms of the invention have been described for purposes of illustration, it is evident that many changes could be made without departing from the spirit of the invention. As a matter of economy, for instance, logic disclosed could be further optimized by application of De Morgan's laws in many places to reduce the number of components, though it has not been done here to avoid complexity of explanation. Such is considered to be within the scope of the disclosure.

We claim:

1. In a data processing mechanism, the combination of a record medium having recorded thereon character and functional control data relating to operation of corresponding mechanisms of a recorder together with other control data not related to operation of said recorder;
  - a reader for said record medium;
  - means for detecting said other control data as a class, including inverter means for indicating absence of detection of said other control data;
  - a signal generator providing first timing signals at a fixed frequency;
  - means operable in response to each said first timing signal to enable said reader to sense the data in the record medium and provide output signals in accordance therewith;
  - means responsive to said output signals for selecting a particular circuit corresponding to the data sensed;
  - means responsive to a first timing signal for producing an actuating signal on said selected circuit;
  - electromechanical means responsive to said circuit signal to actuate the selected one of said recorder mechanisms corresponding to the sensed one of said character and functional control data;
  - means operable in response to the presence of a first timing signal and an output from said inverter means, to provide a second timing signal of duration greater than the time required for completion of said operation of the selected recorder mechanism; and
  - means operable in response to said second timing signal to inhibit production of said actuating signal on said circuit.

2. In a data processing system, the combination of a single set of code lines,
  - two readers for coded-data record media, each reader when enabled being adapted to sense a respective record medium and to produce output signals on the single set of code lines corresponding to the coded-data sensed;
  - plural utilization devices connected in parallel to the set of code lines, at least one of the utilization devices being relatively faster than the other in response to the signals on said code lines;
  - first control means for alternatively enabling each reader;
  - first timing means for causing an enabled reader to sense said respective record medium and produce said output signals on said lines in accordance with the code sensed, said output signals having durations sufficient to ensure response of all said utilization devices;
  - second control means for independently enabling one of said readers, irrespective of the state of the other of said two readers; and second timing means responsive to said second control means, causing said one reader to produce output signals of a duration sufficient to cause response of said one utilization device, yet insufficient to cause response of said other utilization devices.

3. In a data processing system, the combination of a single set of information channels;

two information-bearing record media, two readers, each said reader when enabled to sense a record medium being adapted to produce output signals on said single set of channels;

a plurality of utilization devices responsive to information on said single set of channels;

first timing means for enabling said readers to sense the record media and produce output signals on said channels in accordance with the information sensed;

means responsive to said first timing means for gating information on said channels to a first utilization device;

second timing means for enabling a given one of said readers to sense a record medium and produce output signals on said channels in accordance with the information sensed; and means responsive to said second timing means for gating information on said channels to a second utilization device.

4. A data processing system as in claim 3, wherein said first-mentioned means for enabling each reader are mutually exclusive, and said second timing means enable the disabled one of said two readers for operation independent of the operation of the reader enabled by said first-mentioned means.

5. The data processing system of claim 3 wherein the readers are step-by-step devices capable of producing said output signals at a high rate, said first utilization device can only respond to said signals at a much lower rate, said first timing means operates said readers at a rate appropriate to the first utilization device, and said second timing means operates said first reader at the high rate of which it is capable.

6. A data processing system as in claim 3, wherein said first timing means comprises an astable multivibrator, the output of said multivibrator causing the sensing of the coded medium in said readers when one of said readers is enabled, and further including signal means responsive to selection of said first utilization device and having an output indicating that said first utilization device is ready to accept information, the advance of said readers being controlled conjointly by the output of said multivibrator and said signal means, when one of said readers is enabled by said first timing means.

7. A data processing system as in claim 6, wherein the utilization devices comprise a printing device having electromechanical controls for selective printing of alphanumeric characters and activation of functional controls, a coded media recording device, and respective bistable devices for controlling the enabling of said printing device, said recording device, and said readers.

8. A data processing system as in claim 7, wherein the readers are step-by-step devices and the stepping of the medium in each reader is controlled solely by said astable multivibrator.

9. In a data processing system, the combination of a printer, comprising means for character and functional operations;

a record medium having recorded thereon in successive positions coded data for operation of the printer together with other coded data for controlling the system, a discrete one of said control codes following a printer operation datum initiating a functional operation of substantial duration, a reader for the record medium, means responsive to said reader for operating said printer selectively in accordance with the printer operation codes read in said record medium, means for operating said reader to provide data at a rate greater than the rate the printer can accept, means operable in response to reading one of said coded data to delay the response of the printer to a succeeding printer code, means operable upon reading any of said control codes to generate a signal, means responsive to said signal for immediately advancing said reader to the next reading position, first means operative in response to reader sensing of said discrete control code to disable the responsiveness of said printer to character and functional control data, and second means operative in response to sensing of said discrete control code to enable the reader to sense plural succeeding ones of the character and functional control codes while said printer functional operation is in process.

10. A data processing system as defined in claim 9, wherein said record medium is a perforated paper tape, said first and second means responsive to said discrete control code comprise a first and second gating means and a flip-flop, the set output of said flip-flop enabling the printer through said first gating means to respond to character and functional-control data sensed by the reader, and the reset output of said flip-flop enabling the reader through said second gating means to sense said plural succeeding ones of said codes while said printer functional operation is in process.

11. A data processing system as defined in claim 9, wherein said printer has a carriage and said functional operation includes carriage return and tabulation.

12. A data processing system as defined in claim 9, wherein said printer has print means movable past a plurality of print positions of a document-in-preparation and said functional operation is an idle movement of said print means past a plurality of positions on said document.

13. In a data process-system having means for printing data on a document, said printing means and document being movable relative to each other, the combination of normally disabled record reader means for data input and control of said system;

keyboard means for data input;

means for locking said keyboard when said reader is enabled, including a solenoid, a field control, comprising program control means responsive to the relative positions of the printing means and document, including a perforated paper tape having a plurality of channels, one of said channels having in at least one field position a perforation to enable said reader;

normally-open contact means for sensing said perforations, a flip-flop operative in one of its two states to enable said field control, means for operating said solenoid responsive to signals indicating the reader has been enabled and responsive to the field control means for enabling the reader, said field control responsive means comprising a switch for sensing the actuation of any of the keys on said keyboard, a monostable multivibrator, And-gate means for producing an output when said field control flip-flop is in said one state and said reader enabling channel of the field control paper tape contains a hole at the field position being sensed, said hole permitting closure of said contact means for reading said paper tape, and a pulse-gate adapted when armed to trigger said monostable multivibrator upon closure of said key-actuated switch, said pulse-gate being armed by the output signal from said And-gate and the output of said multivibrator in turn controlling the operation of said keyboard lock solenoid.

14. The combination of claim 13, wherein said solenoid unlocks the keyboard when energized and the output of said multivibrator controls a transistor switch to cut off current flow and de-energize the solenoid.

15. In a data processing system having at least one changeable-state device for controlling operations of the system according to the state of said device, the combination of a typewriter having a carriage and a keyboard containing a plurality of alphanumeric keys, a field control comprising a perforated paper tape secured to said carriage, together with means for sensing perforations in said tape, said field control being normally disabled and said perforation sensing means causing closure of a circuit to a source of potential;

signal output means for enabling said field control, means responsive to the sensing of a perforation in said tape in at least one position of said carriage for conditioning the change of state of said control device, comprising an And-gate having said perforation-sensed potential circuit as one input and said field control enabling signal as a second input;

a pulse-gate operative when opened to change the state of said conditioned control device and having the output of said And-gate as one input, and means responsive to operation of any of said alphanumeric keys to produce a timed series of input signals as a last and controlling input to open said pulse-gate.

16. A data processing system as defined in claim 15, together with an oscillator, and further, said pulse-gate means has plural inputs and the timed input means comprise single-pulse generating means responsive to a signal generated by said key operation, said single-pulse controlling initiation and termination of the output of the oscillator and the output of said single-pulse generating means being one input to said pulse-gate means.

17. A data processing system as defined in claim 16, wherein said means responsive to the operation of any of said alphanumeric keys includes switch means.

18. A data processing system having at least one changeable-state device for controlling the operation of the system according to the state of said device, the combination of a typewriter having a carriage movable in steps and having a keyboard containing a plurality of alphanumeric keys, said carriage being slow to move through a said step relative to the rate at which said keys can be operated;

a field control responsive to the position of said carriage for conditioning the change of state of said device;

first means for generating a first signal in response to actuation of any one of said keys; at least one utilization device for the output of said first signal generating means;

second means responsive to the actuation of any one of said keys to provide a second signal, said second signal being timed to occur after said first signal and after said carriage has moved substantially through said step, and means for changing the state of said conditioned control device in response to the occurrence of said second signal.

19. A data processing system as defined in claim 18, wherein said carriage-position responsive means comprises a perforated paper tape secured to said carriage together with means for sensing perforations in said tape, said conditioning means being responsive to the sensing of a perforation in said tape.

20. A data processing system as defined in claim 18, wherein said second-signal generating means comprises means for providing a single pulse, said single pulse being initiated in response to termination of said first signal; said conditional change of state means comprises pulse-gate means armed by the output of third-signal generating means controlled by said sensing means; and said armed gate means gives an enabling output to said control device when triggered by said single pulse.

21. A data processing system as defined in claim 20, wherein said field control is normally disabled and said sensing means causes closure of a circuit to a source of potential, and further including signal output means for enabling said field control; said means for conditioning a control device comprises And-gate means having said potential circuit as one input and the output of said field control enabling signal means as a second input; and said pulse-gate means having the output of said And-gate as one input, said second-signal generating means responsive to operation of said keys further comprising means for a timed series of input signals to be the triggering input to said pulse gate means under control of said single pulse.

22. A data processing system as defined in claim 21, wherein said pulse-gate means has the output of said single-pulse generating means as an input and the timed input means comprises an oscillator, the initiation and termination of the output of said oscillator being controlled by the output of said single-pulse generating means.

23. In a data processing system having a first paper tape bearing a plurality of perforations indicative of items of information, a step-by-step reader for reading the first paper tape item-by-item automatically under control of a source of constant frequency pulses, and a paper-tape punch for re-recording at least some of the items of information in adjacent positions of a second paper tape, the combination of a key-controlled feed for advancing said second paper tape continuously so long as said key is held operated, comprising a key-operated switch controlling the gating of pulses from said constant frequency source to a solenoid controlling the step-by-step advance of the paper tape in the punch;

means for disabling continuous reading of said first paper tape and enabling manual control of said reading in a single-step mode, comprising a monostable multivibrator operated by a pulse-gate armed by closure of a momentary contact switch and triggered by pulse generating means responsive to pulses from said source of pulses, first gating means responsive in said mode to disable said source of pulses, second gating means responsive to operation of said momentary contact for separately enabling said source of pulses, and third gating means responsive to the operated state of said monostable multivibrator for disabling said second gating means; and means effective to advance said second paper tape just to the next position upon each operation of said key, regardless of the duration of key operation, in response to the enabling of said manually controlled single-step reading of the first paper tape, comprising fourth gating means rendering said monostable multivibrator, said first gating means, and said second gating means alternatively responsive to said key-operated switch.

24. In a data processing system, the combination of a single set of channels, two media having recorded thereon information comprising plural-element codes, a reader for each medium, each reader having a plurality of output lines corresponding in number to the number of code elements and the output lines of each reader being connected in parallel to said single set of channels;

a source of timing signals, means for initiating simultaneous advance of the medium in each reader in response to each said timing signal, means connected to said single set of channels for utilizing said information codes, means responsive to said initiating means to cause delayed reading and transmission of codes, including a discrete code, by said second reader; and means comprising a portion of said utilizing means operable in response to said delayed discrete code to terminate advance of said second reader by said timing signals.

25. A data processing system as defined in claim 24, together with pulse-generating means, the common signal being the output of said pulse-generating means and being used to time the reading of information by said first reader, and said delay means comprising time-delay means coupled to said pulse-generating means to produce a separately-timed pulse to time the reading of information by said second reader.

26. A data processing system as in claim 25, wherein said pulse-generating means comprises an astable multivibrator, the output of said multivibrator enabling a sensing of the coded medium in one of said readers.

27. A data processing system as in claim 26, together with separate means for gating information to said utilizing means and said portion of the utilizing means, wherein said pulse-generating means further include a differentiating circuit coupled to said multivibrator to produce a pulse at the trailing edge of the output signal of said multivibrator, said pulse being used to control the timing of the gating means for said utilization means, and wherein the separate gating means for said portion of the utilizing means comprise an inverter and a pulse-gate coupled to the output of said differentiating circuit.

28. A data processing system as in claim 27, wherein the portion of the utilizing means is a bistable device adapted to give an output indicative of its state, the advance of said second reader being controlled conjointly by the output of said multivibrator and said bistable device when said bistable device is in one of its two states.

References Cited by the Examiner

UNITED STATES PATENTS

| | | | |
|---|---|---|---|
| 2,292,701 | 8/1942 | Kleid | 197—20 |
| 2,297,789 | 10/1942 | Mills et al. | 197—20 |
| 2,605,879 | 8/1952 | O'Halloran | 197—107 X |
| 2,684,745 | 7/1954 | Blodgett | 197—107 X |
| 2,865,487 | 12/1958 | Hildebrandt | 197—20 |
| 2,905,298 | 9/1959 | Blodgett et al. | 197—20 |
| 2,905,299 | 9/1959 | Hildebrandt | 197—20 |
| 3,013,250 | 12/1961 | Maley | 340—172.5 |
| 3,025,941 | 3/1962 | Blodgett et al. | 197—20 |
| 3,030,009 | 4/1962 | Neidharat et al. | 197—107 |

References Cited by the Applicant

UNITED STATES PATENTS

| | | |
|---|---|---|
| 2,448,842 | 6/1945 | Tholstrup. |
| 2,540,030 | 1/1951 | Hamilton. |
| 2,698,075 | 12/1954 | Luhn. |
| 2,784,785 | 3/1957 | Doty. |
| 2,800,539 | 7/1957 | Edminster et al. |
| 2,865,487 | 12/1958 | Hildebrandt. |
| 3,013,250 | 12/1961 | Maley. |
| 3,025,941 | 3/1962 | Blodgett. |

WILLIAM B. PENN, *Primary Examiner.*

ROBERT E. PULFREY, *Examiner.*

E. S. BURR, *Assistant Examiner.*

UNITED STATES PATENT OFFICE

CERTIFICATE OF CORRECTION

Patent No. 3,291,277 December 13, 1966

Ronald N. Borrelli et al.

It is hereby certified that error appears in the above numbered patent requiring correction and that the said Letters Patent should read as corrected below.

In the drawings, sheet 5, FIG. 10, the lead line from reference numeral 1006 should point to the line leading from "And gate" 1005 to "(RDR.1)"; column 2, line 11, for "Sngle" read -- Single --; column 5, line 18, after "4" insert a closing parenthesis; column 6, line 61, for "explary" read -- emplary --; column 7, line 21, for "caused" read -- cause --; column 11, line 14, for "908" read -- 908' --; column 13, line 52, for "voltage-divided" read -- voltage-divider --; column 14, line 34, for "1302" read -- 1301 --; column 16, line 11, for "1404" read -- 1408 --; column 19, line 14, after "1603" insert -- at --; column 22, line 63, for "other" read -- others --; column 25, line 40, for "A" read -- In a --.

Signed and sealed this 25th day of June 1968.

(SEAL)
Attest:

EDWARD M. FLETCHER,JR.
Attesting Officer

EDWARD J. BRENNER
Commissioner of Patents